(12) United States Patent
Hall

(10) Patent No.: US 9,161,158 B2
(45) Date of Patent: Oct. 13, 2015

(54) INFORMATION ACQUISITION USING A SCALABLE WIRELESS GEOCAST PROTOCOL

(75) Inventor: Robert J. Hall, Berkeley Heig, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 39 days.

(21) Appl. No.: 13/169,892

(22) Filed: Jun. 27, 2011

(65) Prior Publication Data

US 2013/0012231 A1    Jan. 10, 2013

(51) Int. Cl.
H04W 24/00 (2009.01)
G06F 15/173 (2006.01)
H04W 4/00 (2009.01)
H04W 4/02 (2009.01)
H04W 40/02 (2009.01)

(52) U.S. Cl.
CPC .............. *H04W 4/006* (2013.01); *H04W 4/021* (2013.01); *H04W 40/023* (2013.01)

(58) Field of Classification Search
USPC ............ 455/448, 449, 456.1–457, 11.1, 41.2; 370/254, 351, 278, 310, 338; 709/206, 709/224; 340/870.01–870.42, 340/539.1–539.29, 2.1–2.81, 3.1–3.9
See application file for complete search history.

(56) References Cited

U.S. PATENT DOCUMENTS

| | | |
|---|---|---|
| 6,015,344 A | 1/2000 | Kelly et al. |
| 6,119,976 A | 9/2000 | Rogers |
| 6,195,751 B1 | 2/2001 | Caronni et al. |
| 6,304,556 B1 | 10/2001 | Haas |
| 6,428,470 B1 | 8/2002 | Thompson |
| 6,628,620 B1 | 9/2003 | Cain |
| 6,781,971 B1 | 8/2004 | Davis et al. |
| 6,807,165 B2 | 10/2004 | Belcea |
| 6,816,460 B1 | 11/2004 | Ahmed et al. |
| 6,870,846 B2 | 3/2005 | Cain |
| 6,879,574 B2 | 4/2005 | Naghian et al. |
| 6,909,706 B2 | 6/2005 | Wilmer et al. |

(Continued)

FOREIGN PATENT DOCUMENTS

WO    WO 2007/016641 A2    2/2007

OTHER PUBLICATIONS

U.S. Appl. No. 13/277,895, filed Oct. 20, 2011, Hall.

(Continued)

*Primary Examiner* — Edward Urban
*Assistant Examiner* — Ralph H Justus
(74) *Attorney, Agent, or Firm* — Baker & Hostetler LLP

(57) ABSTRACT

Information is acquired from a geographically-distributed sensor network using a scalable wireless geocast protocol. Geographically distributed networks of unattended sensors are placed at desired locations to collect various types of information, such as, for example, environmental parameters, temperature, humidity, rainfall, heat signatures, video, audio, seismic activity, and/or wind conditions. To acquire information, a query is provided to the geographic area at which the sensors are located utilizing the geocast protocol. Delivery of the query is based on a physical location of a region in which a sensor network is located, the type of information being queried, and/or temporal conditions. Each sensor that receives a query determines if all requirements/conditions are satisfied. If so, the query is accepted and processed by the recipient sensor, and responded to accordingly. Responses to queries are provided via the geocast protocol.

16 Claims, 14 Drawing Sheets

(56) References Cited

U.S. PATENT DOCUMENTS

| | | |
|---|---|---|
| 6,937,602 B2 | 8/2005 | Whitehill et al. |
| 6,940,832 B2 | 9/2005 | Saadawi et al. |
| 6,954,435 B2 | 10/2005 | Billhartz et al. |
| 6,958,986 B2 | 10/2005 | Cain |
| 7,027,822 B1 | 4/2006 | Hwang et al. |
| 7,152,110 B2 | 12/2006 | Pierce |
| 7,179,166 B1 | 2/2007 | Abbott |
| 7,197,326 B2 | 3/2007 | Acampora |
| 7,295,521 B2 | 11/2007 | Choi et al. |
| 7,307,978 B2 | 12/2007 | Carlson |
| 7,435,179 B1 | 10/2008 | Ford |
| 7,525,933 B1 | 4/2009 | Hall |
| 7,540,028 B2 | 5/2009 | Ahmed et al. |
| 7,613,467 B2 | 11/2009 | Fleischman |
| 7,669,052 B2 | 2/2010 | Asano et al. |
| 7,813,326 B1 | 10/2010 | Kelm et al. |
| 7,864,168 B2 | 1/2011 | French |
| 7,917,169 B1 | 3/2011 | Hall |
| 7,969,914 B1 | 6/2011 | Gerber |
| 7,970,749 B2 | 6/2011 | Uhlir et al. |
| 8,073,327 B2 | 12/2011 | Mayer |
| 8,085,813 B2 | 12/2011 | Melick et al. |
| 8,128,405 B2 | 3/2012 | Preston et al. |
| 8,149,801 B2 | 4/2012 | Hall |
| 8,248,367 B1 | 8/2012 | Barney et al. |
| 8,332,544 B1 | 12/2012 | Ralls et al. |
| 8,341,271 B2* | 12/2012 | Cho et al. ................ 709/227 |
| 8,359,643 B2* | 1/2013 | Low et al. ................. 726/9 |
| 8,376,857 B1 | 2/2013 | Shuman et al. |
| 8,483,652 B2 | 7/2013 | Hall |
| 8,599,848 B2 | 12/2013 | Janneteau |
| 2001/0014094 A1 | 8/2001 | Epley |
| 2002/0113872 A1 | 8/2002 | Kinjo |
| 2002/0141454 A1 | 10/2002 | Muniere |
| 2002/0155846 A1 | 10/2002 | Shiraga |
| 2002/0163912 A1 | 11/2002 | Carlson |
| 2002/0167960 A1 | 11/2002 | Garcia-Luna-Aceves |
| 2002/0169971 A1 | 11/2002 | Asano et al. |
| 2003/0074413 A1* | 4/2003 | Nielsen et al. ............. 709/206 |
| 2003/0105956 A1 | 6/2003 | Ishiguro et al. |
| 2003/0193394 A1 | 10/2003 | Lamb |
| 2003/0235158 A1 | 12/2003 | Lee |
| 2004/0121792 A1 | 6/2004 | Allen et al. |
| 2004/0151144 A1 | 8/2004 | Benveniste |
| 2004/0185881 A1 | 9/2004 | Lee et al. |
| 2004/0213270 A1 | 10/2004 | Su et al. |
| 2005/0036448 A1 | 2/2005 | Leeuwen |
| 2005/0058151 A1 | 3/2005 | Yeh |
| 2005/0083385 A1 | 4/2005 | Ahmed et al. |
| 2005/0086350 A1 | 4/2005 | Mai |
| 2005/0096065 A1 | 5/2005 | Fleischman |
| 2005/0152318 A1* | 7/2005 | Elbatt et al. ................ 370/338 |
| 2005/0152378 A1 | 7/2005 | Bango et al. |
| 2005/0243788 A1 | 11/2005 | Janczak |
| 2005/0254453 A1 | 11/2005 | Barneah |
| 2005/0259597 A1 | 11/2005 | Benedetto |
| 2005/0271057 A1 | 12/2005 | Kim et al. |
| 2006/0013154 A1* | 1/2006 | Choi et al. ................ 370/312 |
| 2006/0023677 A1 | 2/2006 | Labrador |
| 2006/0084444 A1 | 4/2006 | Kossi et al. |
| 2006/0126535 A1* | 6/2006 | Sherman ................ 370/254 |
| 2006/0128349 A1 | 6/2006 | Yoon |
| 2006/0148516 A1 | 7/2006 | Reddy et al. |
| 2006/0153157 A1 | 7/2006 | Roh et al. |
| 2006/0227787 A1 | 10/2006 | Furlong et al. |
| 2007/0008925 A1 | 1/2007 | Dravida et al. |
| 2007/0019591 A1 | 1/2007 | Chou et al. |
| 2007/0019594 A1 | 1/2007 | Perumal et al. |
| 2007/0104096 A1 | 5/2007 | Ribera |
| 2007/0110092 A1 | 5/2007 | Kangude et al. |
| 2007/0180533 A1 | 8/2007 | Ramaiah et al. |
| 2007/0198731 A1 | 8/2007 | Li et al. |
| 2007/0217346 A1 | 9/2007 | Zheng |
| 2007/0259716 A1 | 11/2007 | Mattice et al. |
| 2007/0259717 A1 | 11/2007 | Mattice et al. |
| 2007/0263571 A1 | 11/2007 | Hermann et al. |
| 2007/0265088 A1 | 11/2007 | Nakada et al. |
| 2007/0265089 A1 | 11/2007 | Robarts et al. |
| 2007/0266396 A1 | 11/2007 | Estermann |
| 2007/0283001 A1* | 12/2007 | Spiess et al. ................ 709/224 |
| 2007/0287437 A1 | 12/2007 | Cartmell |
| 2008/0015024 A1 | 1/2008 | Mullen |
| 2008/0039113 A1 | 2/2008 | Liu et al. |
| 2008/0058099 A1 | 3/2008 | Schwartz et al. |
| 2008/0080401 A1 | 4/2008 | Ribiere |
| 2008/0144493 A1 | 6/2008 | Yeh |
| 2008/0147854 A1 | 6/2008 | Van Datta et al. |
| 2008/0159236 A1 | 7/2008 | Ch'ng |
| 2008/0163355 A1 | 7/2008 | Chu |
| 2008/0186206 A1 | 8/2008 | Reumerman |
| 2008/0192737 A1 | 8/2008 | Miyazaki |
| 2008/0262928 A1 | 10/2008 | Michaelis |
| 2009/0017913 A1 | 1/2009 | Bell et al. |
| 2009/0030605 A1 | 1/2009 | Breed |
| 2009/0041039 A1 | 2/2009 | Bear |
| 2009/0045977 A1 | 2/2009 | Bai et al. |
| 2009/0046628 A1* | 2/2009 | Hall ................ 370/328 |
| 2009/0073912 A1 | 3/2009 | Bauchot et al. |
| 2009/0122753 A1 | 5/2009 | Hughes et al. |
| 2009/0138353 A1 | 5/2009 | Mendelson |
| 2009/0175223 A1 | 7/2009 | Hall |
| 2009/0201860 A1 | 8/2009 | Sherman et al. |
| 2009/0207783 A1* | 8/2009 | Choi et al. ................ 370/328 |
| 2009/0245518 A1 | 10/2009 | Bae et al. |
| 2009/0248420 A1 | 10/2009 | Basir |
| 2009/0292926 A1 | 11/2009 | Daskalopoulos et al. |
| 2009/0298461 A1 | 12/2009 | O'Reilly |
| 2009/0323579 A1 | 12/2009 | Bai et al. |
| 2009/0325603 A1* | 12/2009 | Van Os et al. ............. 455/456.2 |
| 2010/0008259 A1* | 1/2010 | Yoon et al. ................ 370/254 |
| 2010/0029245 A1 | 2/2010 | Wood et al. |
| 2010/0042601 A1 | 2/2010 | Kelley et al. |
| 2010/0060480 A1 | 3/2010 | Bai et al. |
| 2010/0064307 A1 | 3/2010 | Malhotra et al. |
| 2010/0067451 A1 | 3/2010 | Hall |
| 2010/0069109 A1 | 3/2010 | Hall |
| 2010/0074234 A1* | 3/2010 | Banks et al. ................ 370/338 |
| 2010/0082513 A1 | 4/2010 | Liu |
| 2010/0128653 A1 | 5/2010 | Tateson |
| 2010/0150129 A1 | 6/2010 | Jin et al. |
| 2010/0162149 A1 | 6/2010 | Sheleheda et al. |
| 2010/0169009 A1 | 7/2010 | Breed et al. |
| 2010/0214987 A1 | 8/2010 | Mori |
| 2010/0215040 A1 | 8/2010 | Kappler et al. |
| 2010/0226342 A1* | 9/2010 | Colling et al. ............. 370/336 |
| 2010/0235633 A1 | 9/2010 | Asano et al. |
| 2010/0245124 A1 | 9/2010 | Bai et al. |
| 2010/0248618 A1 | 9/2010 | Bai et al. |
| 2010/0248843 A1 | 9/2010 | Karsten |
| 2010/0250106 A1 | 9/2010 | Bai et al. |
| 2010/0250346 A1 | 9/2010 | Bai et al. |
| 2010/0279776 A1 | 11/2010 | Hall |
| 2010/0287011 A1 | 11/2010 | Muchkaev |
| 2010/0304759 A1* | 12/2010 | Leppanen et al. ......... 455/456.2 |
| 2010/0329463 A1 | 12/2010 | Ratliff et al. |
| 2011/0002243 A1* | 1/2011 | Sherman et al. ............. 370/280 |
| 2011/0081973 A1 | 4/2011 | Hall |
| 2011/0102459 A1 | 5/2011 | Hall |
| 2011/0103302 A1 | 5/2011 | Hall |
| 2011/0105151 A1* | 5/2011 | Hall .................... 455/456.3 |
| 2011/0177829 A1* | 7/2011 | Platt et al. ................ 455/456.2 |
| 2011/0201369 A1* | 8/2011 | Kim et al. ................ 455/507 |
| 2011/0230202 A1* | 9/2011 | Wood et al. ................ 455/456.1 |
| 2011/0244887 A1* | 10/2011 | Dupray et al. ............. 455/456.2 |
| 2012/0058814 A1 | 3/2012 | Lutnick et al. |
| 2012/0079080 A1 | 3/2012 | Pishevar |
| 2012/0084364 A1* | 4/2012 | Sivavakeesar ................ 709/205 |
| 2012/0094770 A1 | 4/2012 | Hall |
| 2012/0128010 A1 | 5/2012 | Huang et al. |

(56) References Cited

U.S. PATENT DOCUMENTS

2014/0082369 A1 3/2014 Waclawsky et al.
2014/0100027 A1 4/2014 Harris et al.

OTHER PUBLICATIONS

U.S. Appl. No. 13/327,472, filed Dec. 15, 2011, Hall.
U.S. Appl. No. 13/333,084, filed Dec. 21, 2011, Hall.
U.S. Appl. No. 13/683,025, filed Nov. 21, 2012, Panta.
U.S. Appl. No. 13/712,353, filed Dec. 12, 2012, Hall.
Aggarwal, Sudhir et al., "Accuracy in dead reckoning based distributed multi-player games", SIGCOMM '04 Workshops, (Proceedings of 3rd ACM SIGCOMM Workshop on Network and System Support for Games), Aug. 30-Sep. 3, 2004, Portland, Oregon, pp. 161-165.
Bjerver, Martin, "Player Behaviour in Pervasive Games—using the City as a Game Board in Botfighters", Master of Science Thesis, KTH Computer Science and Communication, Stockholm, Sweden, 2006.
Bzflag(6):tank battle game—linux man page, Google date Feb. 1, 2001, downloaded from http://linux.die.net/man/6/bzflag.
de Souza e Silva, Adriana, "Alien revolt (2005-2007): A case study of the first location-based mobile game in Brazil", IEEE Technology and Society Magazine, Spring 2008, pp. 18-28.
Dialogic, "Adding location based services to existing architectures", Application Note: Location-Based Services, 9862-02, Oct. 2007, 14 pages, downloaded from http://www.dialogic.com/-/media/products/docs/signaling-and-ss7-components/9682_Add_Locationbased_Servs_an.pdf.
Gallagher, Sean, "Army prepares test of new wireless war game gear", Defense Systems, Jul. 7, 2008, downloaded from http://defensesystems.com/articles/2008/07/army-prepares-test-of-new-wireless-war-game-gear.aspx.
Halas, Jacek, "Ghost Recon: Advanced Warfighter Game Guide, [Mission 01] Contact!—Objective: Locate Ramirez with the Drone", 2007, downloaded from http://guides.gamepressure.com/ghostreconadvancedwarfighter/guide.asp?ID=986.
Hohfeld, Alexander, "In and out of reality: Janus-faced location awareness in ubiquitous games", Journal of Software, 2(6), Dec. 2007, 86-92.
Kim, Seong-Whan et al., "Kalman filter based dead reckoning algorithm for minimizing network traffic between mobile nodes in wireless GRID", Embedded and Ubiquitous Computing, Lecture Notes in Computer Science, 4096, 2006, 162-170.
Lindo, Wayne A. et al., "Network modeling and simulation in the OneTESS program", Fall Simulation Interoperability Workshop 2006, Orlando, Florida, USA, Sep. 10-15, 2006, 155ff.
MyCheats web page, "Ghost Recon: Advanced Warfighter Superguide, Reach Ramirez", (Jul. 19, 2006), downloaded from http://mycheats.1up.com/view/section/3139558/18404/ghost_recon_advanced_warfighter/pc.
Santos, Nuno et al., "Vector-field consistency for ad-hoc gaming", Middleware 2007, LNCS 4834, 2007, pp. 80-100.
Sotamaa, Olli, "All the world's a Botfighter Stage: Notes on location-based multi-user gaming", Proceedings of Computer Games and Digital Cultures Conference, Tampere University Press, 2002, pp. 35-44.
U.S. Appl. No. 12/837,168, filed Jul. 15, 2010, Hall.
U.S. Appl. No. 12/793,460, filed Jun. 3, 2010, Hall.
U.S. Appl. No. 12/914,886, filed Oct. 28, 2010, Hall.
U.S. Appl. No. 11/264,834, filed Nov. 1, 2005, Hall.
U.S. Appl. No. 12/969,386, filed Dec. 15, 2010, Hall.
U.S. Appl. No. 13/169,829, filed Jun. 27. 2011, Hall.
Ko et al., "Geocasting in Mobile Ad Hoc Networks: Location-based Multicast Algorithms", Technical Report TR-98-018 Texas A&M University, Sep. 1998.
Ko, et al., "Flooding-Based Geocasting Protocols for Mobile Ad Hoc Networks," Mobile Networks and Applications, Dec. 7, 2002, 471-480.
Hall et al., "A Two-Level Quality of Service Scheme for Collision based on Mobile Ad Hoc Networks", IEEE, 1-4244-1513-06/07, 2007, 8 pages.
Hall, "RTEQ: Modeling and Validating Infinite-State Hard-Real-Time Systems", AT&T Labs Research, ASE 2007, Nov. 2007, 4 pages.
Hall, "Cheating Attacks and Resistance Techniques in Geogame Design," Proc. 2010 ACM FuturePlay Symposium, 2010 82-89.
Hall, "An Improved Geocast for Mobile Ad Hoc Networking," IEEE Transactions on Mobile Computing, 2010 1-14.
Illyas, "Body Personal, and Local Ad Hoc Wireless Networks", Chapter 1, CRC Press, 2003, 22 pages.
Liao et al., "GRID: A Fully Location-Aware Routing Protocol for Mobile Ad Hoc Networks", Telecommunication Systems, 2001, 18, pp. 1-26.
Shih et al., A Distributed Slots Reservation Protocol for QoS Routing on TDMA-based Mobile Ad Hoc Networks, 2004, (ICON 2004), Proceedings, $12^{th}$ IEEE International Conference, Nov. 2004, 2, 660-664.
Shih et al., "CAPC: A Collision Avoidance Power Control MAC Protocol for Wireless Ad Hoc Networks", IEEE Communications Letters, Sep. 2005, 9(9), 859-861.
Tseng et al., "Fully Power-Aware and Location-Aware Protocols for Wireless Multi-hop Ad Hoc Networks", Proc. Of IEEE Intl. Conference on Computer Communications and Networks (ICCCn), 2002, 6 pages.
Corbett, et al. "A Partitioned Power and Location Aware MAC Protocol for Mobile Ad Hoc Networks," Technical Report No. 553, University of Sydney, School of Information Technologies, Jul. 2004, 7 pages.
Panta, "GeoV2V: Vehicular Communications Using a Scalable Ad Hoc Geocast Protocol," AT&T Labs Research, 14 pages.
Balasubramaniam, et al. "Interactive WiFi Connectivity For Moving Vehicles," Proceedings of SIGCOMM, Aug. 17-22, 2008, 12 pages.
Maihofer, "A Survey of Geocast Routing Protocols," IEEE Communications Surveys, Jun. 2004, vol. 6, No. 2 32.
Das, et al., "SPAWN: A Swarming Protocol for Vehicular Ad-Hoc Wireless Networks," Proceedings of $1^{st}$ ACM Vanet, Oct. 2004, 2 pages.
German Aerospace Center, Simulation of Urban Mobility, 2010, http://sumo.sourceforge.net, 1 page.
Gupta, et al., "The Capacity of Wireless Networks," IEEE Transactions on Information Theory, 46(2), Mar. 2000, 17 pages.
Hadaller, et al., "Vehicular Opportunistic Communication Under the Microscope," Proceedings of MobiSys, Jun. 11-14, 2007, 206-219.
Heissenbüttel, et al., "BLR: Beacon-Less Routing Algorithm for Mobile Ad-Hoc Networks," Elsevier's Computer Communications Journal, 27, 2003, 15 pages.
Hall, et al., "A Tiered Geocast Protocol for Long Range Mobile Ad Hoc Networking," Proceedings of the 2006 IEEE Military Communications Conf., 2006, 8 pages.
Hull, et al., "CarTel: A Distributed Mobile Sensor Computing System," Proceedings of ACM SenSys, Nov. 2006, 14 pages.
Eriksson, et al., "Cabernet: Vehicular Content Delivery Using WiFi," Proceedings of Mobicom, Sep. 2008, 12 pages.
Karp, et al, "GPSR: Greedy Perimeter Stateless Routing for Wireless Networks," Proceedings of Mobicom, 2000, ACM 2000, 12 pages.
Kuhn, et al., "Geometric Ad-Hoc Routing: Of Theory and Practice," Proc. 2003 Symposium on Principles of Distributed Computing, ACM 2003, 10 pages.
Lee, et al., "CarTorrent: A Bit-Torrent System for Vehicular Ad-Hoc Networks," Mobile Networking for Vehicular Environments, Sep. 2007, 6 pages.
Lee, et al., "Efficient Geographic Routing in Multihop Wireless Networks," Proc. MobiHoc 2005, ACM, 2005, 12 pages.
Ni, et al., "The Broadcast Storm Problem in a Mobile Ad Hoc Network," Proceedings of the $5^{th}$ Annual ACM/IEEE International Conference on Mobile Computing and Networking, ACM, 1999, 151-162.
Manvi, et al., "Performance Analysis of AODV, DSR, and Swarm Intelligence Routing Protocols in Vehicular Ad Hoc Network Environment," Proceedings of IEEE Future Computer and Communications, Apr. 2009.

(56) References Cited

OTHER PUBLICATIONS

Niculescu, et al., "Trajectory Based Forwarding and Its Applications," Proc. Mobicom 2003, ACM, 2003, 13 pages.
Ns-2, "The Network Simulator," 2010, http://isi.edu/nsnam/ns, 2 pages.
Schwingenschlogl, "Geocast Enhancements of AODV for Vehicular Networks," ACM SIGMOBILE Mobile Computing and Communications Review, Jun. 2002, 18 pages.
Shevade, et al., "Enabling High-Bandwidth Vehicular Content Distribution," Proceedings of CoNEXT 2010, Nov. 30-Dec. 3, 2010, 12 pages.
Yassein, et al., "Performance Analysis of Adjusted Probabilistic Broadcasting in Mobile Ad Hoc Networks," Proc. $11^{th}$ Intl. Conf. On Parallel and Distributed Systems Workshops, 2005, 27 pages.
Zahn, et al., "Feasibility Of Content Dissemination Between Devices in Moving Vehicles," Proceedings of CoNEXT 2009, Dec. 1-4, 2009, 11 pages.
Zorzi, et al., "Geographic Random Forwarding (GeRaF) for Ad Hoc and Sensor Networks: Multihop Peformance," IEEE Transactions on Mobile Computing, Dec. 2003, 11 pages.
Social = Gaming—SWiK: http://swik.net/social= gaming. http://askville.amazon.com/Wii-games-play-Internet-Family/AnswerViewer.do?requestId=6796582(2007).
Schutzberg, "Phone-based GPS-based Games: Missing Pieces"; http://www.directionsmag.com/articlephp?article_id=939 (Aug. 17, 2005).
"*Boost Mobile Introduces First Location-based, GPS games in US*" http://www.physorg.com/news5824.html (Aug. 16, 2005).
"*Sony bigwig hints at GPS-enabled PSP games*"; http:www.vespacious.com/sony-bigwig-hints-at-gps-enabled-psp-games.html (Dec. 22, 2008).
Steve:"*GPS-enabled Cell Phone Games*" http://www.strangenewproducts.com/2005/08/gps-enabled-cell-phone-games.html (Aug. 15, 2005).
*Location-Enabled Mobile Gmaing*; http://www.nn4d.com/site/global/market/affiliate_sites/lbsglobe/lbsapplications/mobilegaming.jsp (2007).
Various Authors, The Wikipedia page for the "snake" computer game, Nov. 3, 2008 version, Wikipedia.com, downloaded by the USPTO from http://en.wikipedia.org/w/index.php?title=Snake_(video_game)&oldid=249370716 on Oct. 4, 2012.
Seada et al, "Efficient and robust geocasting protocols for sensor networks", Computer Communications, Elsevier Science Publishers BV, Jan. 10, 2006, 29(2), 151-161.
International Patent Application No. PCT/US2012/038079: International Search Report and Written opinion dated Oct. 17, 2012, 12 pages.
U.S. Appl. No. 13/169,829, filed Jun. 27, 2011, Hall.
U.S. Appl. No. 13/875,735, filed May 2, 2013, Hall.
U.S. Appl. No. 13/890,423, filed May 9, 2013, Hall.
Hall, "Cheating Attacks and Resistance Techniques in Geogame Design," Proc. 2010 ACM FuturePlay Symposium, 2010, 82-89.
Hall, "An Improved Geocast for Mobile Ad Hoc Networking," IEEE Transactions on Mobile Computing, Jan. 14, 2010.
Panta, "GeoV2V: Vehicular Communications Using a Scalable Ad Hoc Geocast Protocol," AT&T Labs Research, 14 pages. (No date available).
Das, et al., "SPAWN: A Swarming Protocol for Vehicular Ad-Hoc Wireless Networks," Proceedings of 1st ACM Vanet, Oct. 2004, 2 pages.
Heissenbuttel, et al., "BLR: Beacon-Less Routing Algorithm for Mobile Ad-Hoc Networks," Elsevier's Computer Communications Journal, 27, 2003, 15 pages.
Ni, et al., "The Broadcast Storm Problem in a Mobile Ad Hoc Network," Proceedings of the 5th Annual ACM/IEEE International Conference on Mobile Computing and Networking, ACM, 1999, 151-162.
Niculescu, et al., "Trajectory Based Forwarding and Its Applications," Proc. Mobicom, ACM, 2003, 13 pages.
Ns-2, "The Network Simulator," 2010, http:i/isi.edu/nsnarn/ns, 2 pages.
Social + Gaming—SWiK: http://swik.net/social+ gaming, 2009. http://askville.amazon.com/Wii-games-play-Internet-Family/AnswerViewer.do?requestId=6796582, 2007.
Schutzberg, "Phone-based GPS-based Games: Missing Pieces"; http://www.directionsmag.com/articlephp?article_id=939, Aug. 17, 2005.
"Boost Mobile Introduces First Location-based, GPSD games in US" http://www.physorg.com/news5824.html, Aug. 16, 2005.
Location Enabled Mobile Gaming; http:/www.nn4d.com/site/global/market/affiliate sites/lbsglobe/lbsappiications/mobilegaming.jsp, 2007.
"Sony bigwig hints at GPS-enabled PSP games"; http:www.vespacious.com/sony-bigwig-hints-at-gps-enabled-psp-games.hmtl, Dec. 22, 2008.
German Aerospace Center, Simulation of Urban Mobility, 2010, http://sumo.sourceforge.net, 1page.
Hallet al., "A Two-Level Quality of Service Scheme for Collision based on Mobile Ad Hoc Networks", IEEE, 1-4244-1513-06/07, 2007, 8 pages.
Maihofer, "A Survey of Geocast Routing Protocols," IEEE Communications Surveys, Jun. 2004, 6(2), 32.
Nicklas et al., "On building location aware applications using an open platform based on the NEXUS Augmented World Model," Software and Systems Modeling, Dec. 2004, 3(4), 303-313.
Nintendo, The computer game "Mario Kart OS", released in North America on Nov. 14, 2005, published by Nintendo, as evidenced by the game FAQ by Alex, downloaded from http://db.gamefaqs.com/portable/ds/file/mario_kart_ds_h.txt, with a game FAQ reported upload date of Jul. 15, 2007, p. 11.
Shih et al., A Distributed Slots Reservation Protocol for QoS Routing on TDMA-based Mobile Ad Hoc Networks, 2004, (ICON 2004), Proceedings, 1iH EEE International Conference, Nov. 2, 2004, 660-664.
Steve:"*GPS-enabled Cell Phone Games*") http://www.strangenewproducts.com/2005/08/gps--enabled-cell-phone-games.html Aug. 15, 2005.
Tseng et al., "Fully Power-Aware and Location-Aware Protocols for Wireless Multi-hop Ad Hoc Networks", Proc. Of IEEE Inti. Conference on Computer Communications and Networks (ICCCn), 2002, 6 pages.
Winkler, Additional date evidence for the Ars Electronica organization archive document http://archive.aec.at/submission/2004/U19/1043/, retrieved from http://web.archive.org/web/20050508084628/http://www.aec.at/en/archives/prix_archive/prix_project.asp?iProjectID=12899, 2005, 1 page.
Winkler, The computer game "GPS::Tron", as evidenced by the Ars Electronica organization archive document http://archive.aec.at/submission/2004/U19/1043/, where the document has an earliest archive.org verified publication date May 4, 2005, pp. 1-2.
Yassein, et al., "Performance Analysis of Adjusted Probabilistic Broadcasting in Mobile Ad Hoc Networks," Proc. 111 Inti. Conf. On Parallel and Distributed Systems Workshops, 2005, 27 pages.
U.S. Appl. No. 14/279,441, filed May 16, 2014, Hall.
Hall, "Combinatorial Communications Modeling of Real-Time Engagement Adjudication Architectures", 2005 IEEE Military Communications Conference, Oct. 2005, vol. 3, 1488-1494.
Harris, RF-6920 C2CE-CNR Situational Awareness Application Brochure, downloaded from http://rf.harris.com/media/RF-6920tcm26-9172.pdf, Nov. 2008, 2 pages.
Kaplan, et al., "The Analysis of a Generic Air-to-Air Missile Simulation Model", NASA Technical Memorandum 109057, Jun. 1994, 48 pages.
Trivette, Sensor integration for the One Tactical Engagement Simulation System (One TESS), downloaded from http://vault.swri.org/cms/papers/3793Presentation_2005SensorsGovOneTESS.pdf, 2005, 28 pgs.

\* cited by examiner

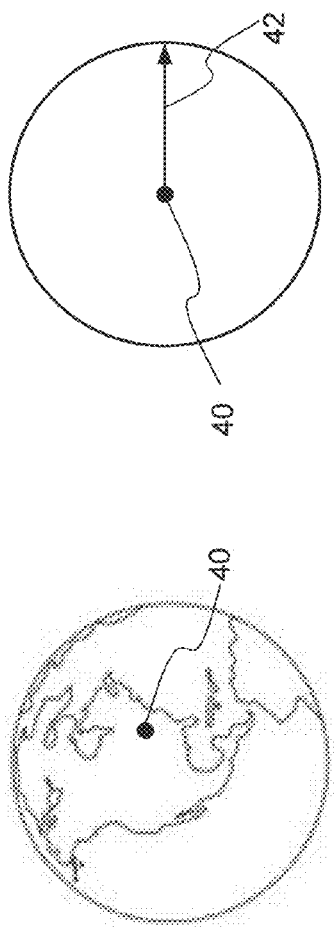
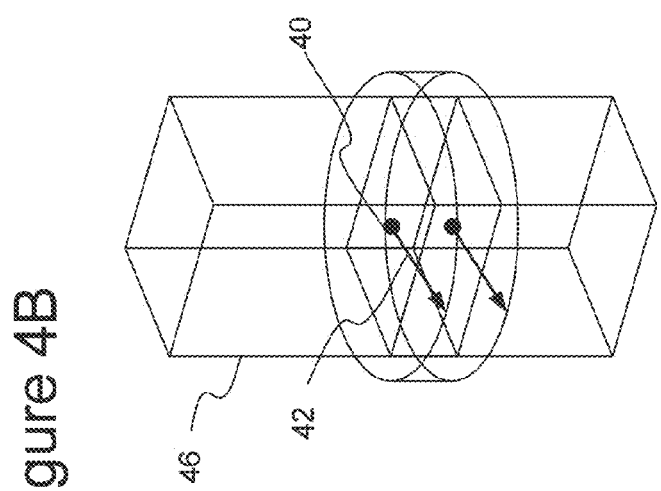
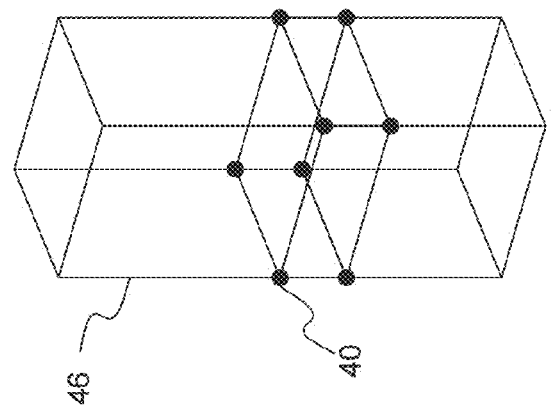
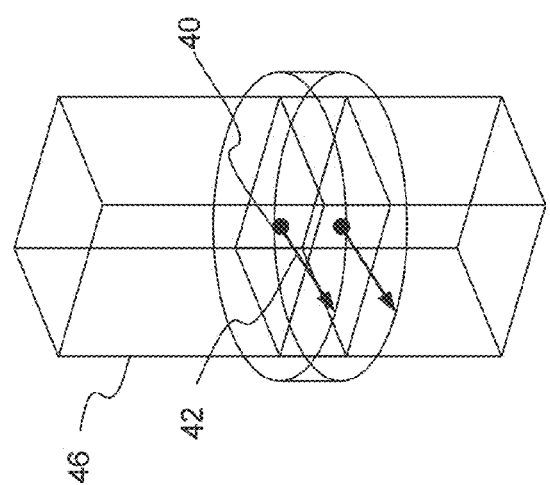
FIGURE 4

INFORMATION ACQUISITION USING A SCALABLE WIRELESS GEOCAST PROTOCOL

TECHNICAL FIELD

The technical field generally relates to acquisition of information and more specifically to acquiring and/or accessing information via a scalable, wireless, geographic broadcast ("geocast") protocol.

BACKGROUND

Typically, to acquire data, a sensor is placed at a desired location, and the sensor is accessed to acquire data. Depending upon the desired location, acquisition of data could be quite difficult. For example, if the desired location is in a remote area (e.g., mountainous area with no access roads), access to the sensor could be difficult. Further, if the exact location of the sensor is not known, acquisition of data from the sensor could be difficult, if not impossible. For example, in the case of a sensor dropped from an aircraft into a forest, acquisition of data from the sensor could be impossible without knowing the sensor's location. As another example, a sensor could be dropped into an ocean or sea. However, as the sensor drifts, due to currents or the like, finding the sensor could be arduous. Depending upon the type of data to be acquired, acquisition of data could be quite difficult. For example, access to a sensor placed behind enemy lines could be difficult and dangerous. Also problematic, is knowing if a sensor is working properly. Typically, a sensor is accessed to acquire data, and only then, upon receiving no data or receiving corrupted data, can the conclusion be made that the sensor has failed. The foregoing difficulties could be greatly exacerbated when working with multiple sensors.

SUMMARY

Information is acquired and/or accessed from a geographically-distributed sensor network using a scalable wireless geographic broadcast ("geocast") protocol. In an example embodiment, geographically distributed networks of unattended sensors are placed at desired locations. Sensors can be placed across an area of a geography to collect various types of information. For example, sensors can acquire information pertaining to environmental parameters, temperature, humidity, rainfall, heat signatures, video, audio, seismic activity, wind conditions, or the like. To acquire information, a query is provided to the geographic area at which the sensors are located utilizing a geocast protocol. Delivery of the query is based on a physical location (or locations) of a region (e.g., geographic area) in which a sensor or sensor network is located. Queries are accepted by sensors satisfying the requirements/conditions of the query. Acceptance of the query by a sensor can be based on any appropriate additional condition or conditions, such as the type of information being queried (e.g., environmental parameter, temperature, humidity, rainfall, heat signature, video, audio, seismic activity, wind conditions, etc.), and/or a temporal condition (e.g., time period, time limit, beginning time, ending time, etc.). In an example embodiment, a physical location is incorporated as part of an addressing protocol in order to route queries to intended sensors at the appropriate locations. Each sensor that receives a query determines if all conditions are satisfied. If so, the query is accepted and processed by the recipient sensor, and responded to accordingly. If not, the query is not accepted by the sensor, but may be retransmitted via the geocast protocol. Responses to queries are provided via the geocast protocol.

BRIEF DESCRIPTION OF THE DRAWINGS

FIG. 4, comprising FIG. 4A-FIG. 4E depict example geocast regions or boundaries.

DETAILED DESCRIPTION OF ILLUSTRATIVE EMBODIMENTS

Figure 1:
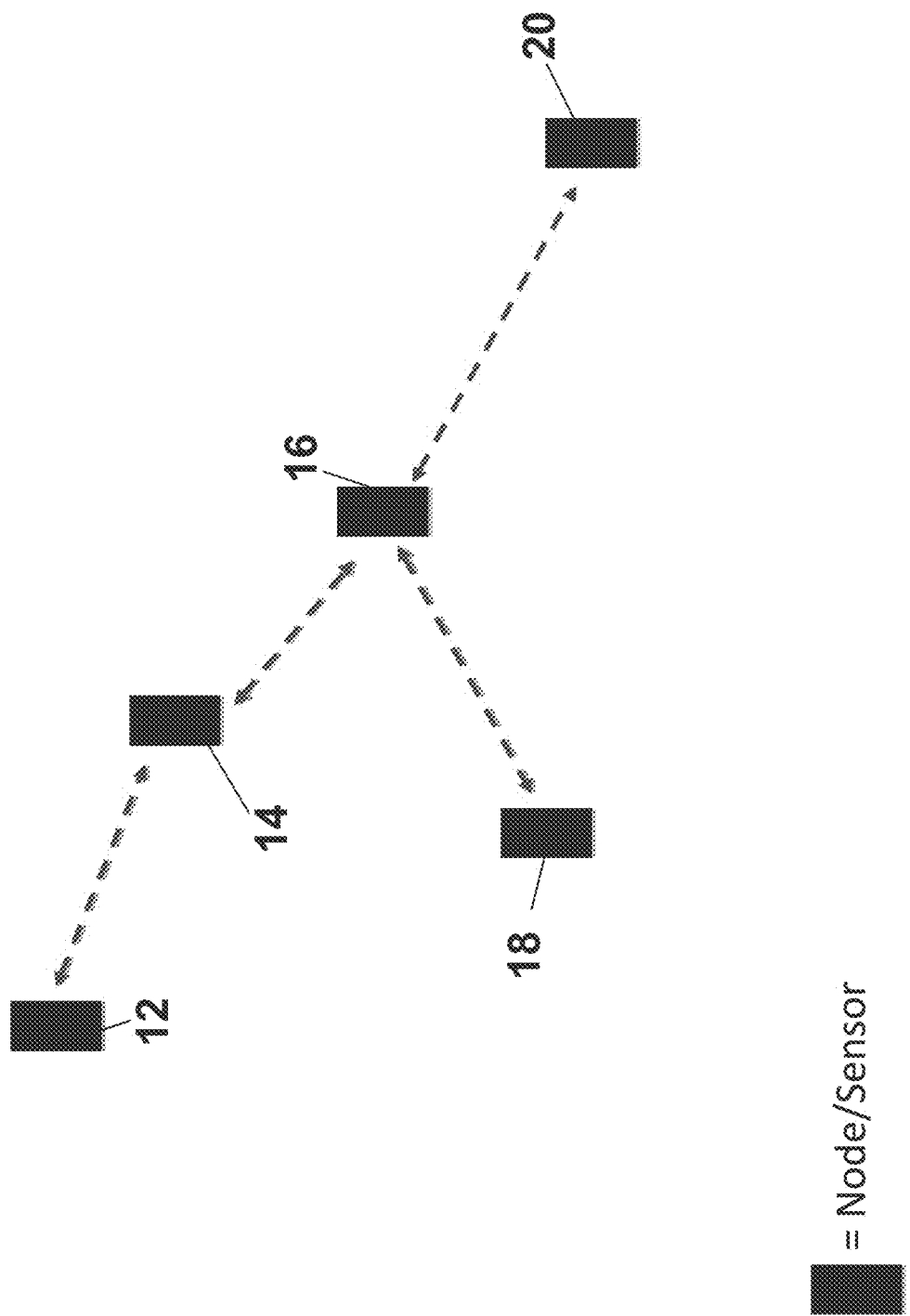
FIG. 1 illustrates an example mobile ad hoc network in which information acquisition/access via a geocast protocol may be implemented.

Information acquisition using a scalable wireless geocast protocol provides the capability to acquire/access information from a geographically distributed sensors. Queries for information and responses thereto are based on conditions being satisfied, such as a geographic location, type of information being sought, and/or a time frame of interest. Relatively low cost communications capable sensors can placed within an area of geography to collect information. Utilization of the geocast protocol, allows for scalable expansion of sensor networks.

Example applications of information acquisition using a scalable wireless geocast protocol include government (military, disaster relief, intelligence community, emergency response, etc.), enterprise (campus and physical plant monitoring), home networking, and smart grid applications. For example, when an agent enters an area, such as a human soldier walking patrol through a valley or forest, the agent can transmit a query using the scalable wireless geocast protocol to the area or a sub-region of the area. Sensors in the area can deliver the query message to other sensors. The sensors within the addressed region can respond by transmitting back, utilizing the geocast protocol (or other appropriate messaging protocol), to the agent their responses containing the desired information. Various other example applications can utilize a vehicle traveling a road through an area to provide a query, an aerial vehicle (e.g., UAV) overflying an area to provide a query, or the like.

Utilizing information acquisition using a scalable wireless geocast protocol, networking is handled in real time, on the fly, without need for provisioning or maintenance of the network, server nodes, or other overhead. Further, information acquisition using a scalable wireless geocast protocol can be easily scaled to handle very large and dense networks of sensors (e.g. hundreds to thousands in an area). The entity providing the initial query need not know in advance which sensors are in the receiving area nor which are working or workable at the time the query is provided. The geocast protocol can operate in an ad hoc fashion, device-to-device, sensor-to-sensor, such that information acquisition can be accomplished in remote areas that do not have the benefit of coverage by infrastructure based networks (e.g., cellular coverage, wireless radio coverage, satellite coverage, etc.).

In an example embodiment, geocasting refers to addressing, transferring, and delivering a message (e.g., query, response, etc.) via a network in a accordance with a geocast protocol wherein the address comprises a geocast region, and/or other conditions. Geocasting provides the ability to transfer a message, via a geocast protocol, from a sender to each member of a set of devices (e.g., sensors) currently occupying the geocast region and, if applicable, satisfying appropriate conditions. Geocasting can provide very efficient tracking of sets of devices (e.g., sensors). Geocasting allows a network to propagate a message completely without need for any centralized server based on local device information.

Geocasting is particularly suited to acquiring information from large numbers of devices (e.g., sensors) and/or highly mobile devices (e.g., sensors) without requiring connection to an infrastructure-based communications network. A mobile ad hoc network is an example of such a set of devices (e.g., sensors). Mobile ad hoc networks extend the reach of data networking into areas and scenarios in which infrastructure-based networking is impossible or impractical. For example, mobile ad hoc networks can allow first responders to use networked messaging and information applications in a zone where the network infrastructure has been destroyed by a disaster. Mobile ad hoc networks can provide military units operating in battlefield situations lacking infrastructure the same types of benefits as infrastructure-based networks. Mobile ad hoc networks can allow networking among low resource nodes, such as man-worn devices powered by lightweight wearable batteries, by allowing units to relay each other's short-range transmissions, instead of each unit transmitting long range directly to the destination. Some mobile ad hoc networks, such as military mobile ad hoc networks, require high security, due to the life-critical nature of battlefield secrecy.

Various embodiments of information acquisition/access via a geocast protocol are described herein. The described embodiments are merely examples that may be embodied in various and alternative forms, and combinations thereof. As used herein, for example, "exemplary," and similar terms, refer expansively to embodiments that serve as an illustration, specimen, model, or pattern. The figures are not necessarily to scale and some features may be exaggerated or minimized, such as to show details of particular components. In some instances, well-known components, systems, materials, or methods have not been described in detail in order to avoid obscuring the instant disclosure. Therefore, specific structural and functional details disclosed herein are not to be interpreted as limiting, but rather as a basis for the claims and as a representative basis for teaching one skilled in the art how to employ the teachings instant application in various ways.

While the herein description includes a general context of computer-executable instructions, information acquisition/access via a geocast protocol also can be implemented in combination with other program modules and/or as a combination of hardware and software. The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, hand-held computing devices, microprocessor-based, programmable consumer electronics, combinations thereof, or the like. It is to be understood that a processor comprises hardware or a combination of hardware and software.

In an example embodiment, information acquisition/access via a geocast protocol is implemented via a scalable, wireless, geographic broadcast ("geocast") protocol, and devices (e.g., sensors) taking part in information acquisition/access via a geocast protocol are programmed with an application, which uses geolocation information obtained from a locating system, such as, for example, a global positioning system (GPS), or the like. Geocast protocols differ from a traditional Internet protocol (IP) such as the uniform datagram protocol (UDP) in that messages are addressed to a destination geocast region instead of an IP address, such as an UDP address. Utilizing the geocast protocol, devices (e.g., sensors) in a target area do not need to register to a group address, as required of some other protocols. In some example embodiments, each geocast data packet is assigned, at origination, a globally unique packet serial number. The unique packet serial number is read by participating devices according to the protocol to, for example, determine whether a particular data packet is being received for a first time or has been received before. The packet serial number and all other packet information may be positioned in a header or body of the data packet.

Although basic geocasting over only a single network (e.g., long-range network) enables communications in some situations where traditional networking is impractical or inadequate, it is in some embodiments preferable to selectively geocast over one or more of two or more networks (i.e., tiers) versus the flat configuration of a single network. The tiered geocast protocol of the present disclosure improves on single-network geocasting by providing the heuristics, or decision rules, for selectively propagating geocast data packets within a relatively short-range, peer-to-peer network, and bridging packets onto a long-range network for long-distance transport depending on various circumstances. Each participating device (e.g., sensor) and other device (e.g., sensor) have forwarding rules, including geographical parameters, and a look-up table for use in implementing the rules.

In one embodiment, the geocast system is configured such that a transmitting device (e.g., sensor) receives a confirmation that a geocast data packet was transmitted successfully. For example, it is contemplated that at least one of the devices (e.g., sensors) in a geocasting destination region, even if not a device (e.g., sensor) actively participating in responding to a query, could return a geocast confirmation data packet indicating that the packet was received by a device (e.g., sensor) in the region. In one contemplated embodiment, although the protocol is based on a geographical address and not a device-specific address, a device-specific address, or other appropriate identifier, of a target device (e.g., sensor) could be included in a geocast and the target device (e.g., sensor) could initiate inclusion in a return geocast data packet of a confirmation of receipt message to the originator of the query.

In addition, in some embodiments, a geocast data packet includes one or more fields, such as in a header or body of the packet, in which information related to a path taken by a packet is recorded. For example, a receiving device (e.g., sensor) receiving a geocast can retrieve data from the geocast header to identify an ordered list of the devices (e.g., sensors) whose transmissions led to the receiving device (e.g., sensor) receiving it. In this way, path discovery is integrated into the transmission process. Any device (e.g., sensor) can also use this information to send a source-routed unicast back to any device (e.g., sensor) along the path, which is termed reverse-path forwarding (RPF).

Although a two-tiered communication system, including a first short-range peer-to-peer network and a long-range network, is described herein, the information acquisition/access via a geocast protocol application of the present disclosure may be implemented in connection with a protocol and communication system using other types of networks as well as or instead of those described herein, and in connection with more than two network tiers.

Propagations over the short-range network are made between devices programmed with the scalable tiered geocast protocol, whereby adjacent devices (e.g., sensors) are within range of each other, such as radio range (e.g., 100 meters). The devices (e.g., sensors) and tiered geocast protocol are configured to transmit geocast data packets over one or more short-range networks, including existing wireless local area networks (WLANs), such an IEEE 802.11 network, or the like. As an example, when a first device (e.g., sensor) is about 900 meters from an edge of a geocasting region including a second device (e.g., sensor), a geocast data packet from the first device (e.g., sensor) could be broadcasted and participating intermediate devices (e.g., sensors) could receive and retransmit the geocast data packet until it reached the geocast region, without need for transmission over an Internet router or other base station. In this example, depending on the location of a retransmitting device (e.g., sensor), the geocast data packet can be broadcast to the geocast region in one or two hops.

To better understand information acquisition/access via a geocast protocol and applications thereof, a description of mobile ad hoc networks is provided. It is to be understood however, that applications of information acquisition/access via a geocast protocol are not limited to mobile ad hoc networks. Rather, information acquisition/access via a geocast protocol is applicable to any appropriate device (e.g., sensors) or group of devices (e.g., sensors).

A mobile ad hoc network comprises communications devices (also referred to as nodes) that communicate with each other via geographical broadcasting, referred to as geocasting. Geocasting is described in U.S. Pat. No. 7,525,933, entitled "System And Method For Mobile Ad Hoc Network," filed Nov. 30, 2005, issued Apr. 28, 2009, and is incorporated by reference herein in its entirety. Geocasting uses a protocol in which an IP address is replaced with a geographic address. Thus, each geocast message comprises an indication of a location of a geographic region of intended reception of the geocast message. Generally, a packet is sent to every communications device located within a specific geographic region. The packet can contain an indication of the location of the sender, an indication of the geographic region, a payload, or a combination thereof, or the like. The communications devices in the geographic region, and any other communications devices that can communicate with them, are referred to, collectively, as a mobile ad hoc network. No registration is required to become a member of the mobile ad hoc network. Any communications device in the mobile ad hoc network can send a message to any or every communications device in the mobile ad hoc network. As communications devices move within communications range of any member of the mobile ad hoc network, they can become members of the mobile ad hoc network without requiring registration. The communications devices of the ad hoc network of communications devices communicate with each other. The ad hoc network of communications devices does not require base station terminals to control communications between the mobile devices. In example embodiments, base stations or routers may be used to relay messages between different mobile ad hoc networks, or to use other network transports such as other traditional internet protocol networks, such as the internet, to bridge messages between mobile ad hoc networks. Each communications device is capable of receiving and/or transmitting data packets to and/or from other communications devices in the mobile ad hoc network.

In an example embodiment, a communications device transfers packets to other communications devices according to heuristic decision rules that determine whether a receiving device will re-transmit a received packet. These rules effectively guide packets to their destinations and control communication traffic within the ad hoc network. The decision rules achieve this control by using statistics obtained and recorded by a communications device as it receives packets transmitted within reception range within its environment. This distributed packet transfer mechanism results in packets "flowing" to and throughout the geocast region specified in each packet. The communications devices in the geocast region receive and process each distinct packet, typically rendering the content to the user via a user interface of a communications device. Two packets are distinct if they contain distinct geocast identifiers. However, a re-transmitted copy of a packet generally will contain the same geocast identifier as the original packet.

FIG. 1 illustrates an example mobile ad hoc network in which information acquisition/access via a geocast protocol may be implemented. Communications devices, also referred to herein as devices, sensors, or nodes, in the mobile ad hoc network can communicate via RF encoded with geographic information, via Bluetooth technology, via WiFI (e.g., in accordance with the 802.11 standard), or the like, or any combination thereof. For example, as depicted in FIG. 1, communication devices 12, 14, 16, 18, and 20 form a mobile ad hoc network. As shown in FIG. 1, communication device 12 communicates with communications device 14 directly (e.g., via Bluetooth). Communication device 14 communicates with communications device 16, and thus can retransmit information received from communications device 12 to communications device 16, and vice versa (retransmit information received from communications device 16 to communications device 12). Communications device 16 communicates with communications devices 18 and 20, and can relay information from/to communications devices 18 and/or 20 to/from communications devices 12 and/or 14.

Although not depicted in FIG. 1, it is possible, in a mobile ad hoc network, that, for a pair of nodes (A and B for example), node A can receive from node B but node B can not receive from node A. This asymmetric style of communication is potentially potential likely in a mobile ad hoc network.

In an example embodiment, communications devices that receive a message, such as a query or a response, can resend the query/response in accordance with the scalable wireless geocast protocol. For example, a communication device's ability to retransmit a query/response can be based on the number of times the query/response was previously received, the communication device's proximity with respect to the communications devices from which the query/response was sent, and/or the communication device's proximity to the geocast region. This can be implemented as a three step location-based approach, which is described in detail in the aforementioned U.S. Pat. No. 7,525,933, entitled "System And Method For Mobile Ad Hoc Network," filed Nov. 30, 2005, issued Apr. 28, 2009. First, in accordance with the location-based approach, the receiving communication device determines whether it has previously received the same query/response at least a predetermined number (N) of times. If not, it retransmits the query/response over the ad hoc network of communications devices. If so, the communications device progresses to the second step and determines whether the sending communications device is closer than some minimum distance away. If no prior transmitter of the query/response was closer than some minimum distance away, the communications device retransmits the query/response over the ad hoc network of communications devices. Otherwise, the communications device progresses to the third step and determines whether it is closer to the center of the geocast region than any sending communications device from which the query/response was received. If so, the communications device transmits the query/response over the ad hoc network of communications devices. If not, the communications device does not retransmit the query/response.

This location-based approach prevents the receiving communications device from retransmitting a message that was most likely already retransmitted by another communications device located close to it (and thus most likely reaching the same neighboring communications devices that it can reach). In addition, this location-based approach reduces the chance that the communications device will retransmit the same message multiple times to the same neighboring communications devices.

As mentioned above, a mobile ad hoc network does not require a communications network infrastructure or a WiFi access point. However, in an example configuration, a mobile ad hoc network can utilize WiFi access points and/or a communications network infrastructure.

Figure 2:
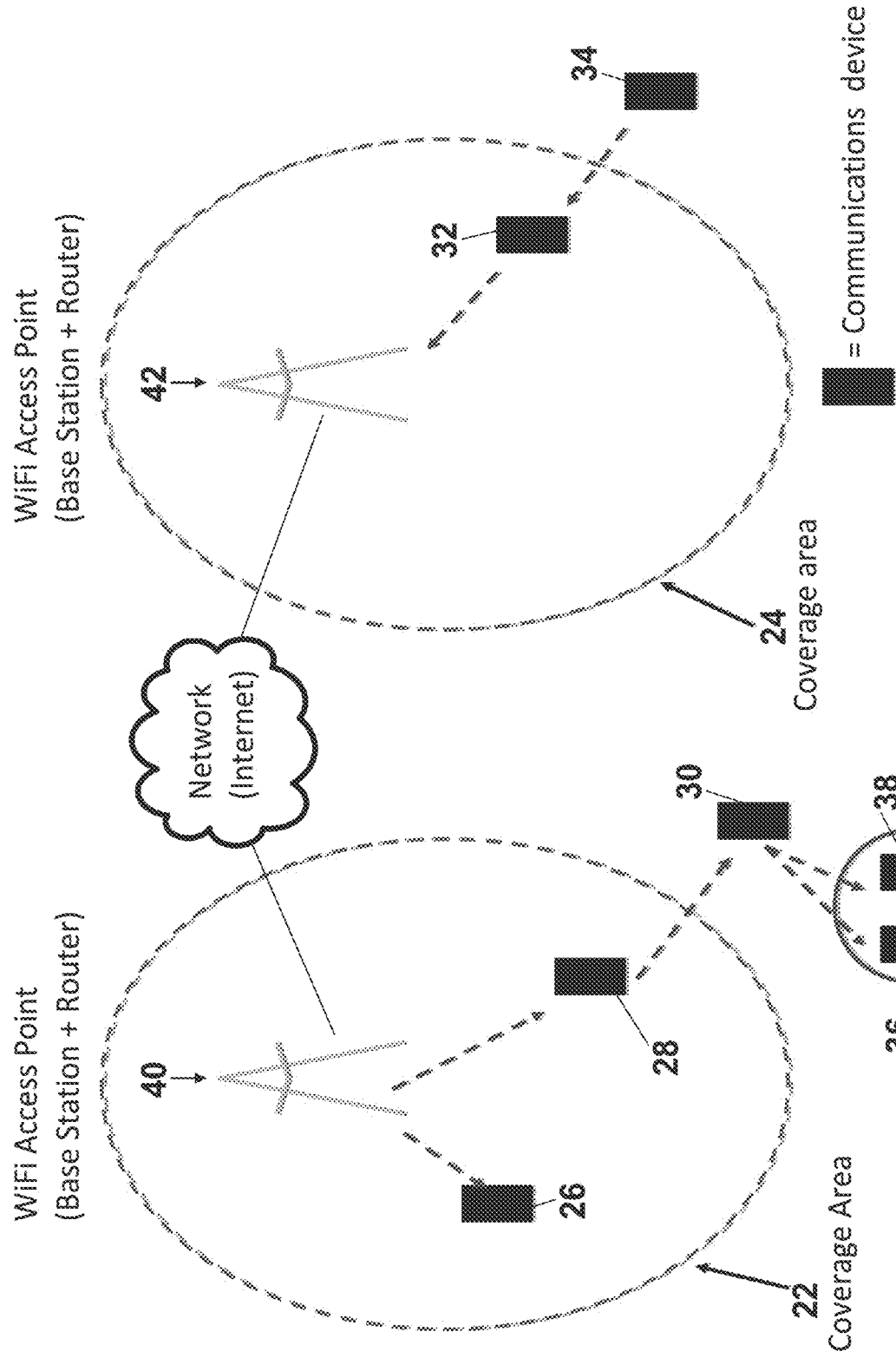
FIG. 2 illustrates example communications in an ad hoc network in which information acquisition/access via a geocast protocol can be implemented via a WiFi access point.

FIG. 2 illustrates example communications in an ad hoc network in which information acquisition/access via a geocast protocol can be implemented via a WiFi access point. As depicted in FIG. 2, communication devices 26, 28, 30, 36, and 38 form a mobile ad hoc network and communication device 32 and 34 form another mobile ad hoc network. Coverage area 22, which is the area covered by a WiFi access point 40, covers communication devices 26 and 28. Coverage area 24, which is the area covered by another WiFi access point 42 covers communication device 32. As shown in FIG. 2, communication device 34 transmits to communication device 32 directly (e.g., via Bluetooth). Communication device 32 retransmits to a WiFi access point 42 which in turn retransmits to the other WiFi access point 40. Communication devices 26 and 28 receive the transmission from the WiFi access point 40, and communication device 28 retransmits directly to communication device 30. And, as depicted, communication device 30 retransmits to other communication devices 36 and 38.

Figure 3:
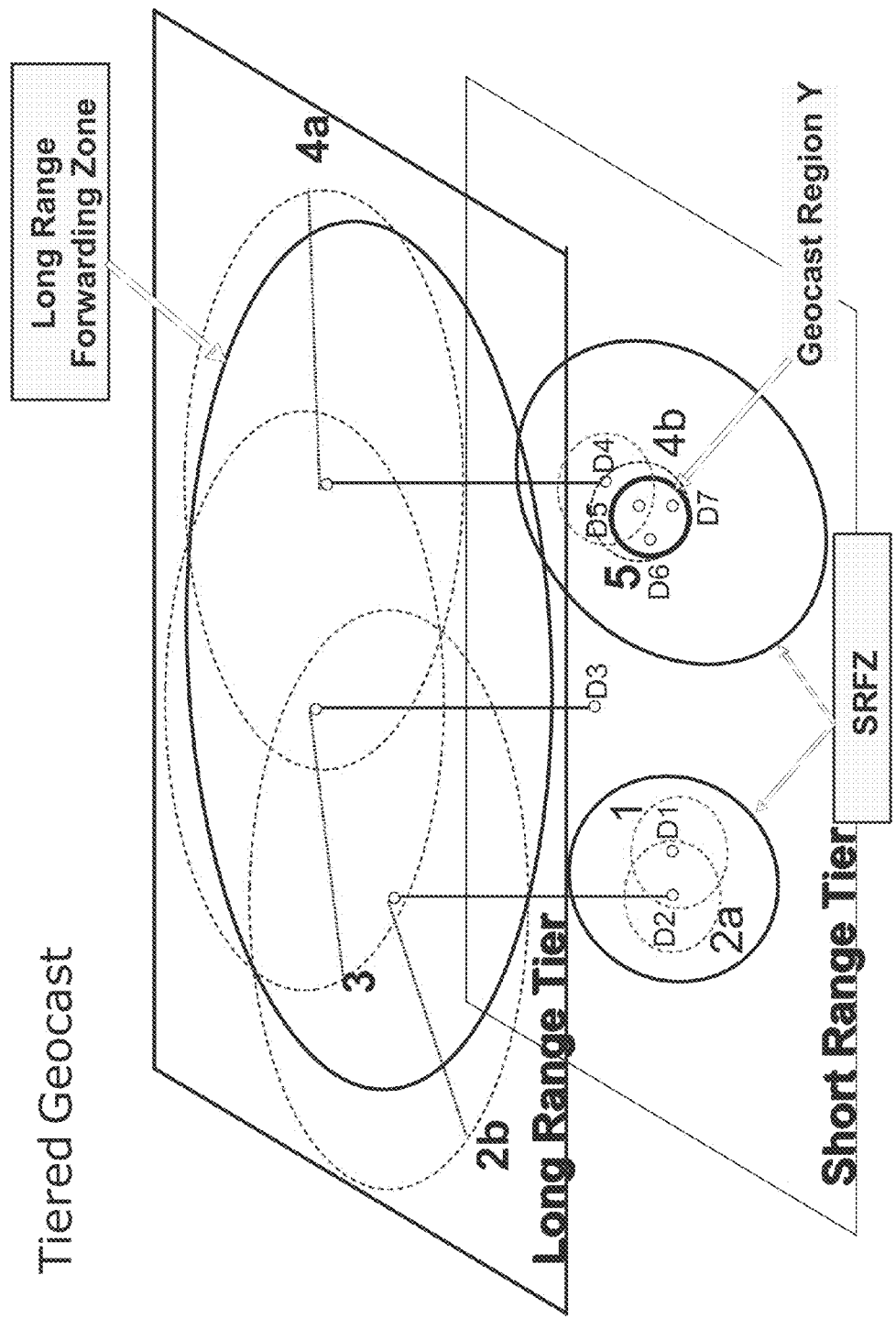
FIG. 3 illustrates an example mobile ad hoc network in which information acquisition/access via a geocast protocol can be implemented utilizing tiered geocasting and forwarding zones.

FIG. 3 illustrates an example mobile ad hoc network in which information acquisition/access via a geocast protocol can be implemented utilizing tiered geocasting and forwarding zones. Tiered geocasting uses long range (LR) transmitters (such as communications devices, etc.), infrastructure, a communications network, a cellular tower, or a combination thereof, when available. Tiered geocasting assumes that at least one tier is usable by at least one of the communications devices. A long range tier is a tier wherein characteristic message transfers between devices occur over a longer physical range than those over some other tier. A long range tier can be wireless, wired, or a combination thereof.

A forwarding zone can be utilized to implement tiered geocasting. A common forwarding zone can be defined for all geocast packets or different forwarding zones can be defined for each type of geocast packet. Forwarding zones (as shown in FIG. 3, for example and without limitation) can be defined differently in different tiers, even for the same packet type or even same packet. Thus, forwarding heuristics can be applied independently per tier, with bridging at multi-tier capable nodes. In an example embodiment, a communications device retransmits a packet only if the communications device is located within the forwarding zone defined for the packet's type. This determination is in addition to the determinations described above and, if the communications device is not in the forwarding zone, the packet will not be retransmitted, even if one or more of the above conditions would otherwise have caused a retransmission hold.

As depicted in FIG. 3, nodes (e.g., communications devices) D1, D2, D3, D4, D5, D6, and D7, are at various locations within short range (SR) and long range (LR) tiers. All of devices D1, D2, D3, D4, D5, D6, and D7 together form a mobile ad hoc network, with devices D5, D6, and D7 being located in geocast region Y, hence being targets of a message sent by D1. Each communications device D1, D2, D3, D4, D5, D6, and D7 can determine its own geographical location through any type of location determination system including, for example, the Global Positioning System (GPS), assisted GPS (A-GPS), time difference of arrival calculations, configured constant location (in the case of non-moving nodes), any combination thereof, or any other appropriate means. Each communications device is operable to transmit and receive packets on a mobile ad hoc network. In addition, at any given time, some subset (possibly all) of the communications devices may be operable to transmit and receive packets over the long range tier network. For example, though not a limitation, in FIG. 3, devices D2, D3, and D4 can transmit and receive messages over both the short and long range tiers. Note that this latter fact is indicated visually in the diagram by D2, D3, and D4 each having two dots (one in the short range tier and one in the long range tier) connected by a vertical line. The long-rang tier network can be any network in which packets can be transmitted from one long range capable communications device to another long range capable communications device. Such packet networks can include, for example, an infrastructure-based network comprising wireless base stations (for up- and down-link) operating on a separate frequency from that used by an ad hoc network. In addition, the long rang tier network also could be implemented simply as another instance of an ad hoc network using distinct radio frequencies and possibly longer radio ranges.

Communications device D1 transmits the message, and communications device D2 receives the transmission from communications device D1. Communications device D2 retransmits (transmission 2a), within the short range tier and in accordance with the heuristics for the short range forwarding zone (SRFZ) as well as within the long range tier (transmission 2b). Communications D2, with long range transmission capability (in the long range tier) retransmits in the long range tier as well (transmission 2b). Communications device D3 receives the transmission 2b from communications device D2 and retransmits (as transmission 3) in the long range tier only. Communications device D4 receives the transmission 3 from communications device D3 and retransmits both on the long and short range tiers, resulting in transmission 4a in the long range tier and 4b in the short range tier. Communications device D5, within geocast region Y, receives the transmission 4a, and in turn retransmits (transmission 5) within the geocast region Y. Transmission 5 is received by the other devices in geocast region Y, namely devices D6 and D7, thus completing the geocast message transfer.

As described above, sensors can be deployed in a geographic area. Geocast origination, destination, and termination regions can be defined by geographic parameters and may have any size and shape. As examples, the regions may be defined by three or more bounding geographic coordinates, forming a triangle, rectangle, or other shape, or a single geographic coordinate and a radius or diameter, forming a geocast region.

FIG. 4, comprising FIG. 4A-FIG. 4E depicts example geocast regions or boundaries. A geocast region may be defined to be a single point 40, as depicted in FIG. 4A. A point geocast region may be defined by a longitude value and a latitude value (not shown). A point above the surface of the earth could be defined by providing an altitude value in addition to longitude and latitude values. A geocast region may also comprise multiple single points (not shown) such as the single point 40. Location points such as point 40 may be used as the building blocks for more complex geocast region geometries, as described herein. FIG. 4B depicts a geocast region defined by a point 40 in combination with a radius 42. The geocast region of this example will comprise the area enclosed by the radius, and may include the space above the area as well. A geocast region could also be defined as the overlap region between two or more circular geocast regions (not shown). FIG. 4C depicts a more complex geometry formed from a series of points 40 interconnected with straight boundary lines. This technique of geocast region definition is similar to the techniques typically used in the definition of parcels of real property. FIGS. 4D and 4E depict the creation of one or more geocast regions within a single geographic footprint. FIG. 4D depicts creating a geocast region for a specific floor of a building 46. The single floor geocast region is defined as the volume of space between upper and lower areas, each formed using a series of points 40 set at corners of the buildings. FIG. 4E depicts an alternate technique for defining a single floor geocast region in building 46. Upper and lower points 40 are defined in the middle of the ceiling and the floor of the geocast region respectively. The single floor geocast region is then defined as the volume of space between an upper area and a lower area defined by a pair of radii 42 extending from the middle points. Geocast regions may also be defined to change in size, geographic location, etc. with time (not shown), essentially allowing the creation of geocast regions in four dimensions. For example a region corresponding to a sensor deployment region may be defined to change size, shape, and/or geographic location over time as the number of participating sensors fluctuates. Information defining a particular geocast region (e.g., a series of points) can be communicated in an addressing portion of a geocast message. Geocast sub-regions may be defined within a particular geocast region using the above techniques. It should be noted that the techniques described with reference to FIGS. 4A-4E are merely examples, and the scope of the instant disclosure should not be limited thereto. Other sensor deployment region geometries and techniques for defining sensor deployment regions may be recognized by those skilled in the art, and are meant to be included within the scope of the instant disclosure.

In some embodiments, a sensor deployment geocast region can be selected by making one or more selections on a map and/or from a list. A region can be selected from a list displayed on a mobile communications device, or the like. The list can comprise real world locations. For example, one can scroll through a list by touching the display surface of a mobile communications device, or the like, by providing a voice command (e.g., "Scroll List"), by entering text on which to search, by moving the device, or any appropriate combination thereof. In another example embodiment, the selection of a sensor deployment region, or the like can be made by selecting a location on the map by a finger, fingers, and/or any other appropriate device, and, for example, dragging away or gesture-pinching, from the selected location to create the size of the a circle, oval, rectangular, square, polygon, or any appropriate shape (two dimensional or three dimensional) representing a destination, termination, boundary, region, or the like. In various example embodiments, locations, such as addresses, and/or region dimensions, building names, institution names, landmarks, etc. may be input in other ways by a player, such as by typing, gesture, and/or voice input.

Figure 5:
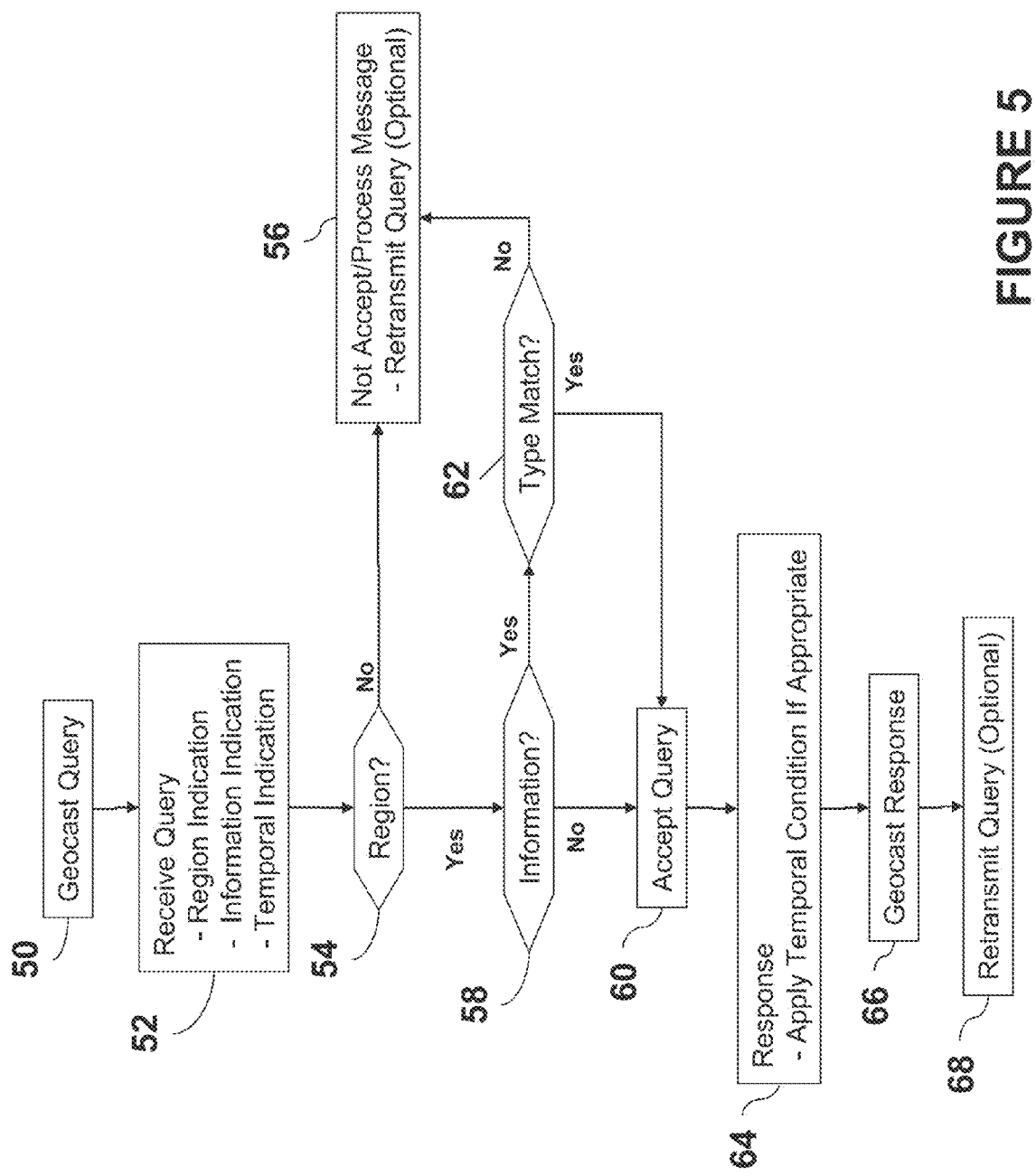
FIG. 5 is a flow diagram of an example process for acquiring/accessing information via a geocast protocol.

FIG. 5 is a flow diagram of an example process for acquiring/accessing information via a geocast protocol. A query is geocast at step 50. The query is received at step 52. The query can be received by one of more of the devices (e.g., sensors) as described above. In various example configurations, the query can comprise an indication of a geographic region, an indication of a temporal condition (e.g., time frame, start time, end time), an indication as to the type of information sought, or any combination thereof.

The indication of the geographic region can comprise an indication of a region, such as for example a region within which intended recipient devices (e.g., sensors) are located, or expected to be located. The region can be described in terms of any appropriate shape, location, or the like. For example the region can be described as a building or group of buildings (e.g., campus), landmark, institution (e.g., National Institutes of Health, etc.), or the like. The region can be described as a geometric shape, such as a rectangle, a circle, a hexagon, an irregular shape, a curvilinear shape, or any combination thereof. The region can be in two or three dimensions. For example, the region can be a sphere or any appropriate three-dimensional shape. The region can be defined in the content of communications among geocast ad hoc network members. Thus, information describing the region (e.g., location, size, shape, coordinates, range of coordinates, etc.) can be contained in packets communicated among the geocast ad hoc network devices (e.g., sensors). The information could vary from packet to packet, vary as a function of time (e.g., geographic region changes as sensors drift), and/or predetermined and fixed prior to communications between the devices (e.g., sensors) of the geocast ad hoc network.

The indication as to the type of information sought can be indicative of any appropriate information. Example types of information include information pertaining to environmental parameters, temperature, humidity, rainfall, heat signatures, video, audio, seismic activity, wind conditions, or the like.

The indication of a temporal condition (e.g., time frame, start time, end time, etc.) can be indicative of a time, time period, time interval, time beginning at a start time, time leading up to an end time, or the like during which information was gathered by the sensor and/or during which devices/sensors are expected to be within the target region. For example, a query could be geocast requesting information that was obtained by sensors during a previous number of hours, days, etc., during a time frame between a start time and end time, during time after a given start time, or the like, or any combination thereof. For example, the temporal conditions could include a specific time of day, a window around a time of day, an amount of time to be added to the time the geocast message was received to determine a time window, any number of predetermined times or time windows, or the like. As one example, an advertiser could geocast a coupon, for a particular product, to all recipients located in a store of a competitor.

At step 54, it is determined if the device (e.g., sensor) receiving the query is located within the region indicated in the query. Determination as to whether the device (e.g., sensor) is within the region can be accomplished by any appropriate device, apparatus, system, or the like. In an example embodiment, the device (e.g., sensor) that received the geocast query determines if the device (e.g., sensor) is within the region. For example, the receiving device/sensor can process the query to extract the indication of the region. The device/sensor can compare the device's current physical location with the region. The current physical location of the device/sensor can be determined in any appropriate manner. For example, a device/sensor can determine its own geographical location through any type of location determination system including, for example, the Global Positioning System (GPS), assisted GPS (A-GPS), time difference of arrival calculations, configured constant location (in the case of non-moving nodes), any combination thereof, or any other appropriate means.

If it is determined, at step 54, that the device/sensor is not within the region, the query is not accepted or processed by the recipient device/sensor, at step 56. It is to be understood that the process depicted in FIG. 5 is not necessarily separate from retransmission (transfer) of the query. Thus, in embodiments wherein the geocast query is retransmitted via a geocast, or other geographically-based network protocol, step 56 may be conducted as part of the execution of that protocol. Geocast processing can be used to get the message to the recipient as well as to decide if the recipient is in the set of specified regions.

As described above, the query can contain an indication of the type of information be sought. If the query contains an indication of the type of information being sought, the device/sensor determines if it is the correct device/sensor to provide the type of information being sought. For example, if the query contains an indication that temperature is being sought, and the recipient device/sensor is a wind sensor, the device/sensor is not the correct type of device/sensor. If the query does not contain an indication of the type of information being sought, the device/sensor will accept the query in order to provide a response of indicative of the type of information the device/sensor has obtained.

Accordingly, if it is determined, at step 54, that the device/sensor is within the region, it is determined, at step 58, if the query contains an indication of the type of information being sought. If the query does not contain an indication of the type of information being sought, the query is accepted by the recipient device/sensor, at step 60. If the query does contain an indication of the type of information being sought, it is determined, at step 62, if the recipient device/sensor is the correct sensor (capable of providing the type of information being sought) for providing the type of information being sought. If the type of information being sought does not match the device/sensor's capabilities, the process proceeds to step 56. If the type of information being sought does match the device/sensor's capabilities, that is, if the recipient device/sensor is the correct type of device/sensor to provide the type of information being sought, the query is accepted by the recipient device/sensor at step 60.

A response to the query is generated at step 64. The query is processed by the recipient device/sensor, and if the query contains an indication of a temporal condition, information obtained during the specific temporal condition parameters is incorporated into the response. If the query contains no indication of a temporal condition, all available appropriate information obtained by the recipient device/sensor is incorporated into the response. Determination as to whether a temporal condition(s) is satisfied can be accomplished in any appropriate manner. For example, the recipient device/sensor receiving the geocast query signal can determine a time based on an internal clock of the device, and compare it to the temporal condition(s), a time provided by other than the device receiving the geocast query (e.g., GPS, external clock, network entity, etc.) can to be used to compare to the temporal indication(s).

In an example embodiment, depending upon the nature of the geocast protocol, the query can be retransmitted, via a geocast, by the recipient device/sensor, at step 66.

Figure 6:
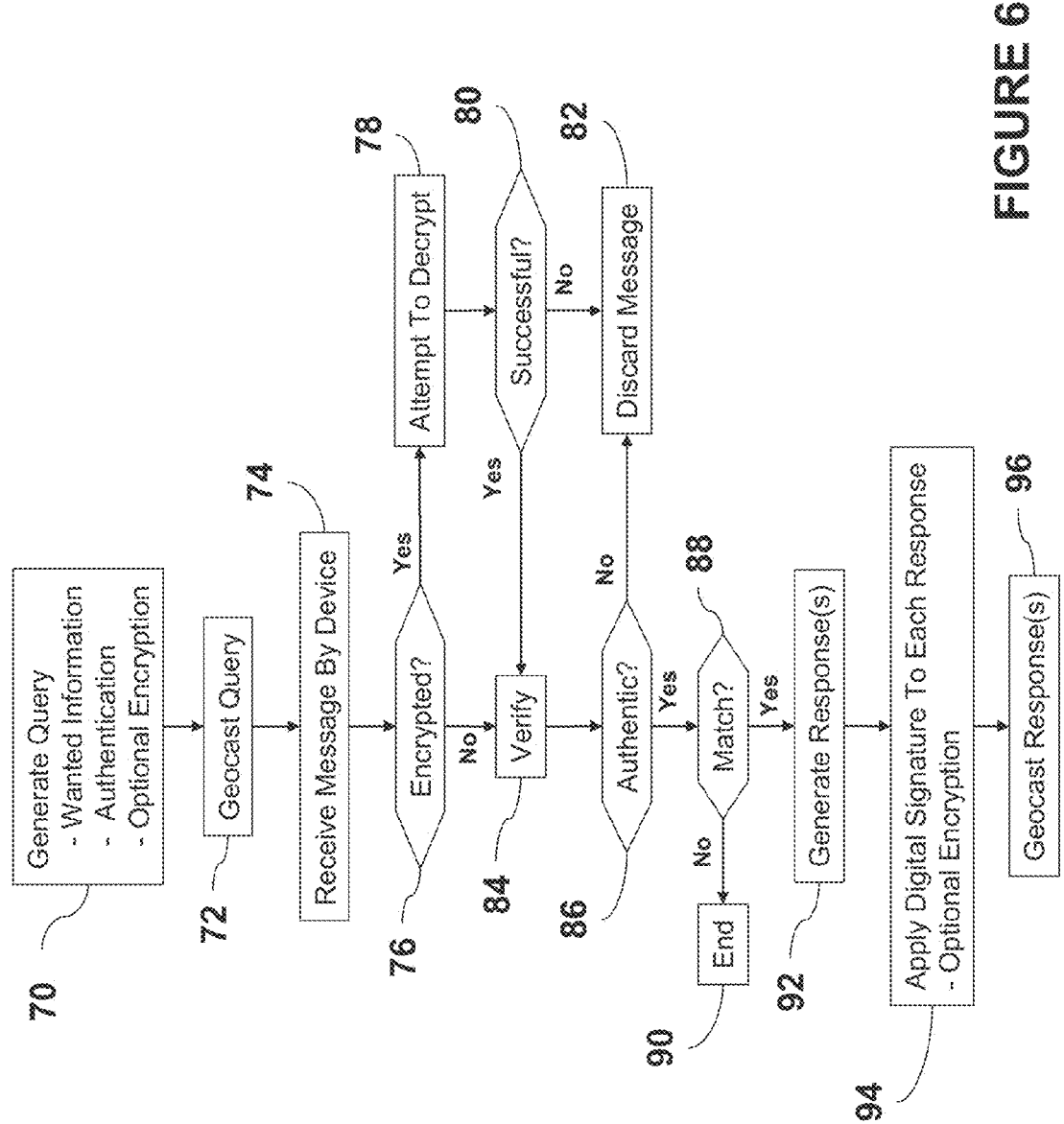
FIG. 6 is a flow diagram of another example process for acquiring/accessing information via a geocast protocol.

FIG. 6 is a flow diagram of another example process for acquiring/accessing information via a geocast protocol. A query is generated at step 70. The query can comprise a message that includes, as described above, an indication of a geographic region, an indication of a temporal condition (e.g., time frame, start time, end time), an indication as to the type of information sought, or any combination thereof. The message can contain a description of the desired information (information being sought—wanted information), a digital signature, or the like, for authentication purposes, or a combination thereof. The indication as to the type of information sought can be indicative of any appropriate information as described herein. Optionally, the message can be encrypted.

The query is geocast at step 72. The query can be geocast to any appropriate region, location, or the like. The geocast message is received by a device at step 74. It is to be understood that the geocast query can be received by multiple devices and the process depicted by steps 74 et seq. in FIG. 6 could occur for each device that receives the geocast query. If the message of the query was encrypted (step 76), the device attempts to decrypt the message at step 78. If the attempt to decrypt the message is not successful (step 80), the message is discarded at step 82. If the attempt to decrypt the message is successful (step 80), the query/message is verified at step 84. The message can be verified to determine if the message is authentic. In an example configuration, the message is verified utilizing the digital signature that was included when generating the query (e.g., step 70). Verification utilizing a digital signature can be accomplished via any appropriate mechanism as known. For example, the message, the query, or any appropriate portion or portions thereof can be operated on by a hash function to obtain a first hash value. The first hash value can be included with the query. The first hash value may or may not be encrypted. At step 84, the same portion or portions of the message and/or query can be operated on by the same hash function to obtain a second hash value. If the first hash value is the same as the second hash value, the query/message can be determined to be authentic. If the first hash value is not the same as the second hash value, the query/message can be determined not to be authentic. It is to be understood that the foregoing description of verifying the query/message is an example, and not limiting. Any appropriate mechanism or technique for verifying the query/message may be used.

At step 86, if the query/message is determined to be not authentic, the message is discarded at step 82. If the query/message is determined to be authentic (at step 86), it is determined, at step 88, if there is a match between information contained (stored) in the device and the type of information being sought. For example a match could pertain to data type, value attributes, contextual attributes (e.g., time of collection, location of collection, etc.), or the like, of information pertaining to environmental parameters, temperature, humidity, rainfall, heat signatures, video, audio, seismic activity, wind conditions, or the like.

If it is determined, at step 88, that there is no match between information contained (stored) in the device and the type of information being sought, the process ends at step 90.

If it is determined, at step 88, that there is a match between information contained (stored) in the device and the type of information being sought, a response, or responses, is generated at step 92. For example, the device can package matching data and/or properties into one or more response messages. A response message could include, for example, a list of data, a summarization of data, an abstraction of data, or the like, or any appropriate combination thereof. Prior to packaging, various processes could be applied, such as, for example, noise reduction, smoothing, filtering, or the like. In an example embodiment, packaging comprises converting information into a transmittable format, such as, for example, byte-wise encoding (e.g., base 64, MIME, etc.). At step 94 a digital signature, or the like, is generated from the response(s) and applied to the response(s). Thus, if multiple responses are generated, multiple digital signatures can be generated and applied, respectively. The response message(s) can, optionally, be encrypted at step 94. The response is, or responses are, geocast at step 96. In an example embodiment, the device can geocast the response message, or messages, to the region, or regions, location extracted from the query message, such as, for example, the location from which the querier sent the query. In an example embodiment, the geocast response(s) could contain information extracted from the query message, such as, for example, the identity of querier, a time of query, a sequence number, etc.

Figure 7:
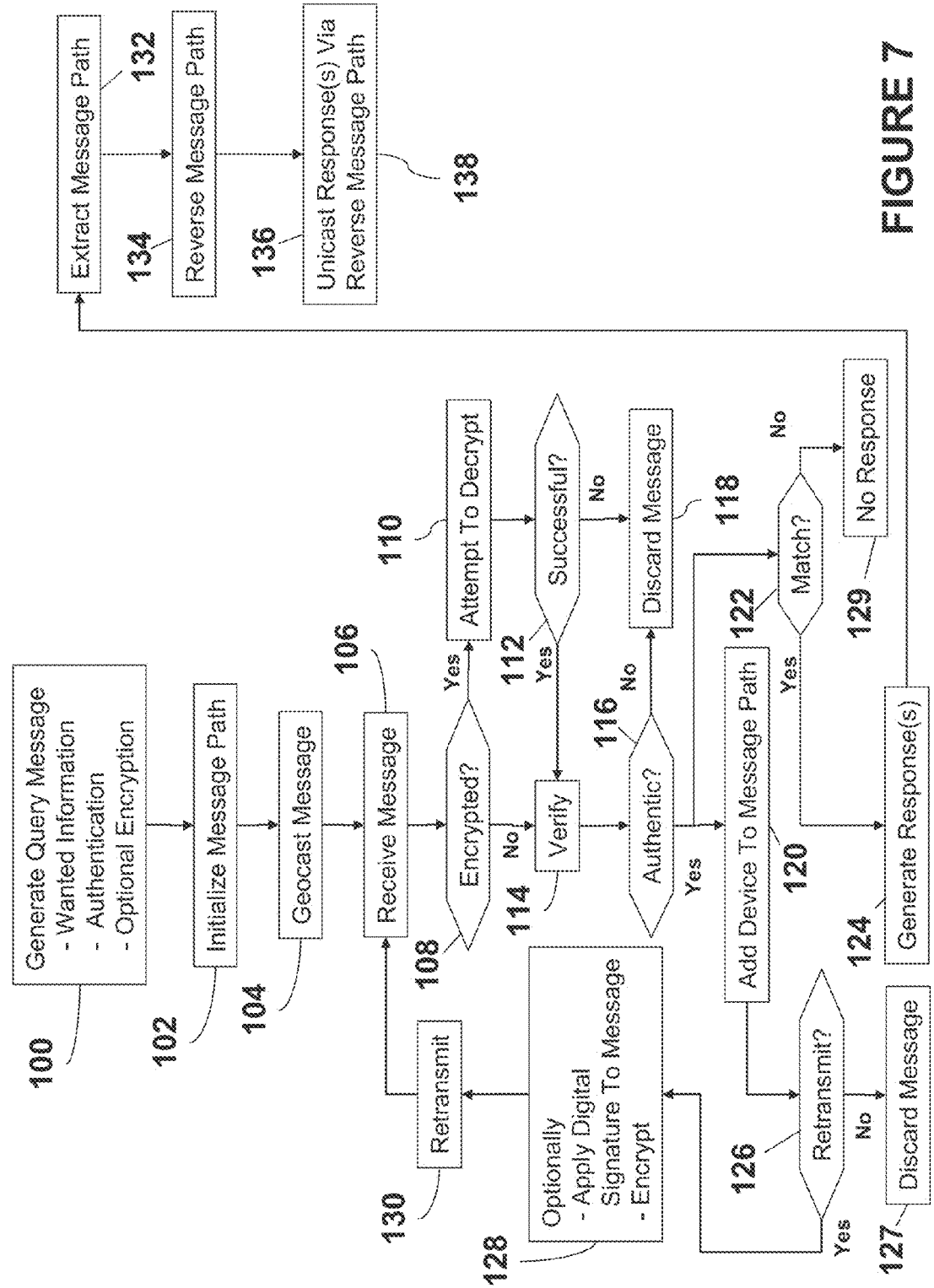
FIG. 7 is a flow diagram of another example process for acquiring/accessing information via a geocast protocol utilizing reverse path forwarding.

FIG. 7 is a flow diagram of another example process for acquiring/accessing information via a geocast protocol utilizing reverse path forwarding. A query is generated at step 100. The query can comprise a message that includes, as described above, an indication of a geographic region, an indication of a temporal condition (e.g., time frame, start time, end time), an indication as to the type of information sought, or any combination thereof. The message can contain a description of the desired information (information being sought—wanted information), a digital signature, or the like, for authentication purposes, or a combination thereof. The indication as to the type of information sought can be indicative of any appropriate information as described herein. Optionally, the message can be encrypted.

The path of the message is initialized at step 102. The path is initialized with an indication of the device sending the message. Thus, an indication of the device sending the message is included in the message.

The message is geocast at step 104. The message can be geocast to any appropriate region, location, or the like. The geocast message is received by a device at step 106. It is to be understood that the geocast query can be received by multiple devices and the process depicted by steps 106 et seq. in FIG. 7 could occur for each device that receives the geocast message. If the message of the query was encrypted (step 100), the device attempts to decrypt the message at step 110. If the attempt to decrypt the message is not successful (step 112), the message is discarded at step 118. If the attempt to decrypt the message is successful (step 112), the query/message is verified at step 114. The message can be verified to determine if the message is authentic. In an example configuration, the message is verified utilizing the digital signature that was included when generating the message (e.g., step 100). Verification utilizing a digital signature can be accomplished via any appropriate mechanism as known. For example, the message, the query, or any appropriate portion or portions thereof can be operated on by a hash function to obtain a first hash value. The first hash value can be included with the query. The first hash value may or may not be encrypted. At step 114, the same portion or portions of the message and/or query can be operated on by the same hash function to obtain a second hash value. If the first hash value is the same as the second hash value, the query/message can be determined to be authentic. If the first hash value is not the same as the second hash value, the query/message can be determined not to be authentic. It is to be understood that the foregoing description of verifying the query/message is an example, and not limiting. Any appropriate mechanism or technique for verifying the query/message may be used.

At step 116, if the query/message is determined to be not authentic, the message is discarded at step 118. If the query/message is determined to be authentic (at step 116), the process proceeds along two paths. If the query/message is determined to be authentic (at step 116), the current device is added to the message path at step 120. That is, an indication of the current device is added to the message. From step 120, the process proceeds to step 126 described below. Additionally, if the query/message is determined to be authentic (at step 116), it is determined, at step 122, if there is a match between information contained (stored) in the device and the type of information being sought. For example a match could pertain to data type, value attributes, contextual attributes (e.g., time of collection, location of collection, etc.), or the like, of information pertaining to environmental parameters, temperature, humidity, rainfall, heat signatures, video, audio, seismic activity, wind conditions, or the like.

If it is determined, at step 122, that there is no match between information contained (stored) in the device and the type of information being sought, no response is sent (step 129). The determination as to whether the message is to be retransmitted can be in accordance with the example descriptions of retransmission determination as described herein and/or as described in the aforementioned U.S. Pat. No. 7,525,933.

If the message is to be retransmitted (step 126), at step 128 a digital signature, or the like, may be generated from the message, portion, and/or portions thereof, and applied to the message. The response message can, optionally, be encrypted at step 128. The message is retransmitted at step 130. Therefrom, the process proceeds to step 106 and proceeds as previously described. If, at step 126, it is determined that the message is not to be retransmitted, the message is discarded at step 127.

If it is determined, at step 122, that there is a match between information contained (stored) in the device and the type of information being sought, a response, or responses, is generated at step 124. For example, the device can package matching data and/or properties into one or more response messages. A response message could include, for example, a list of data, a summarization of data, an abstraction of data, or the like, or any appropriate combination thereof. Prior to packaging, various processes could be applied, such as, for example, noise reduction, smoothing, filtering, or the like. In an example embodiment, packaging comprises converting information into a transmittable format, such as, for example, byte-wise encoding (e.g., base 64, MIME, etc.). From step 124, the process proceeds to step 132 wherein the message path is extracted from the message. Thus, in an example embodiment, a list of all previous devices in the path is obtained from the message. The message path is reversed at step 134, and the message/response(s) is unicast using the reversed message path. Thus, in an example embodiment, the current device can transmit a source-routed unicast message/response(s) using the reverse message path as the source route.

Figure 8:
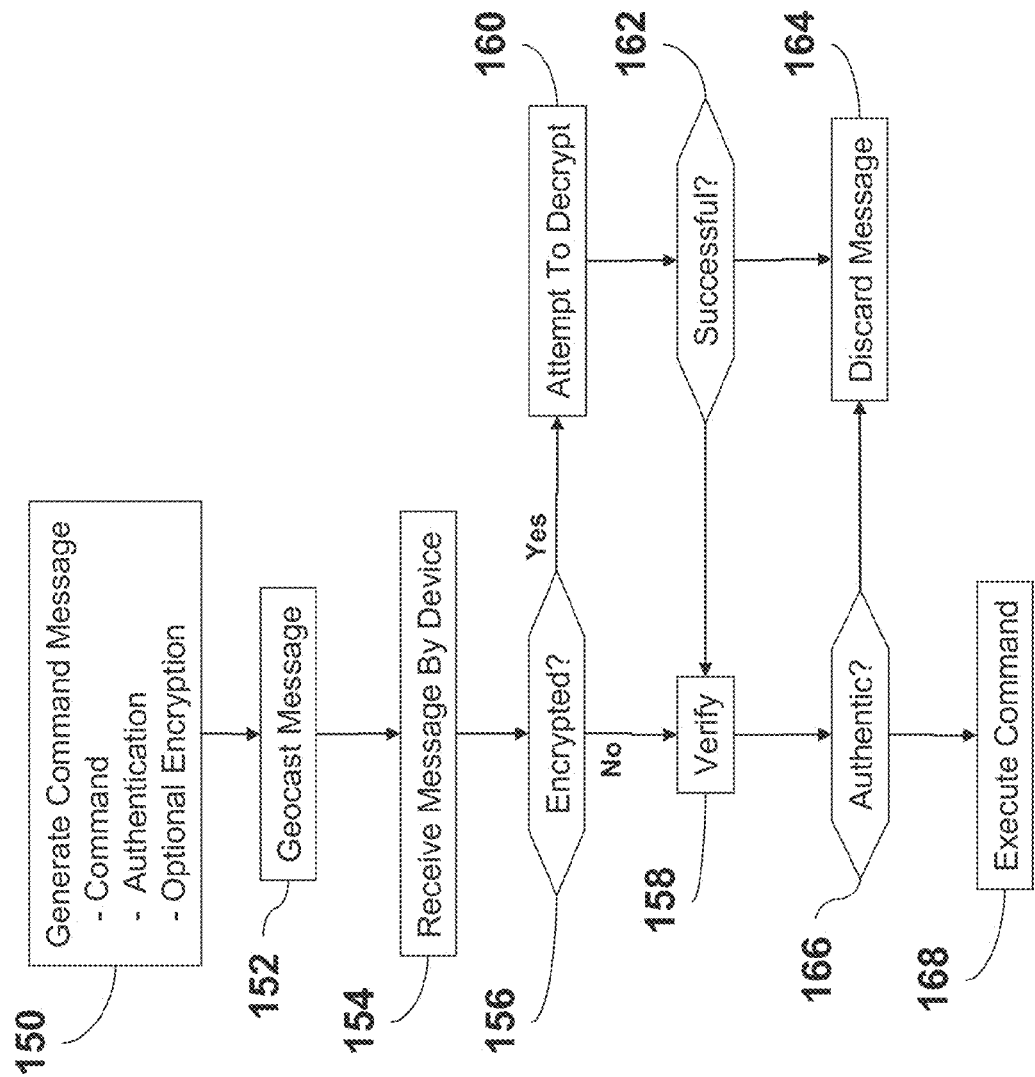
FIG. 8 is a flow diagram of an example process of geocast-based command/control messaging.

FIG. 8 is a flow diagram of an example process of geocast-based command/control messaging. A command message is generated at step 150. The command message can comprise, for example, a command script message. The command can be indicative of any appropriate command or commands, for example, set off an alarm sound (e.g., looking for people under rubble), downloading data, load software, restart, or the like. In an example embodiment, the command message can contain a digital signature, or the like, for authentication purposes. Optionally, the command message can be encrypted.

The command message is geocast at step 152. The command message can be geocast to any appropriate region, location, or the like. The geocast message is received by a device at step 154. It is to be understood that the command message query can be received by multiple devices and the process depicted by steps 154 et seq. in FIG. 8 could occur for each device that receives the geocast command message. If the command message was encrypted (step 150), the device attempts to decrypt the command message at step 160. If the attempt to decrypt the command message is not successful (step 162), the command message is discarded at step 164. If the attempt to decrypt the command message is successful (step 162), the command message is verified at step 158. The command message can be verified to determine if the command message is authentic. In an example configuration, the command message is verified utilizing the digital signature that was included when generating the command message (e.g., step 150). Verification utilizing a digital signature can be accomplished via any appropriate mechanism as known. For example, the command message, or any appropriate portion or portions thereof can be operated on by a hash function to obtain a first hash value. The first hash value can be included with the command message. The first hash value may or may not be encrypted. At step 158, the same portion or portions of the command message can be operated on by the same hash function to obtain a second hash value. If the first hash value is the same as the second hash value, the command message can be determined to be authentic. If the first hash value is not the same as the second hash value, the command message can be determined not to be authentic. It is to be understood that the foregoing description of verifying the command message is an example, and not limiting. Any appropriate mechanism or technique for verifying the command message may be used.

At step 166, if the command message is determined to be not authentic, the message is discarded at step 164. If the command message is determined to be authentic (at step 166), the command (e.g., the command script) is executed at step 168.

Figure 9:
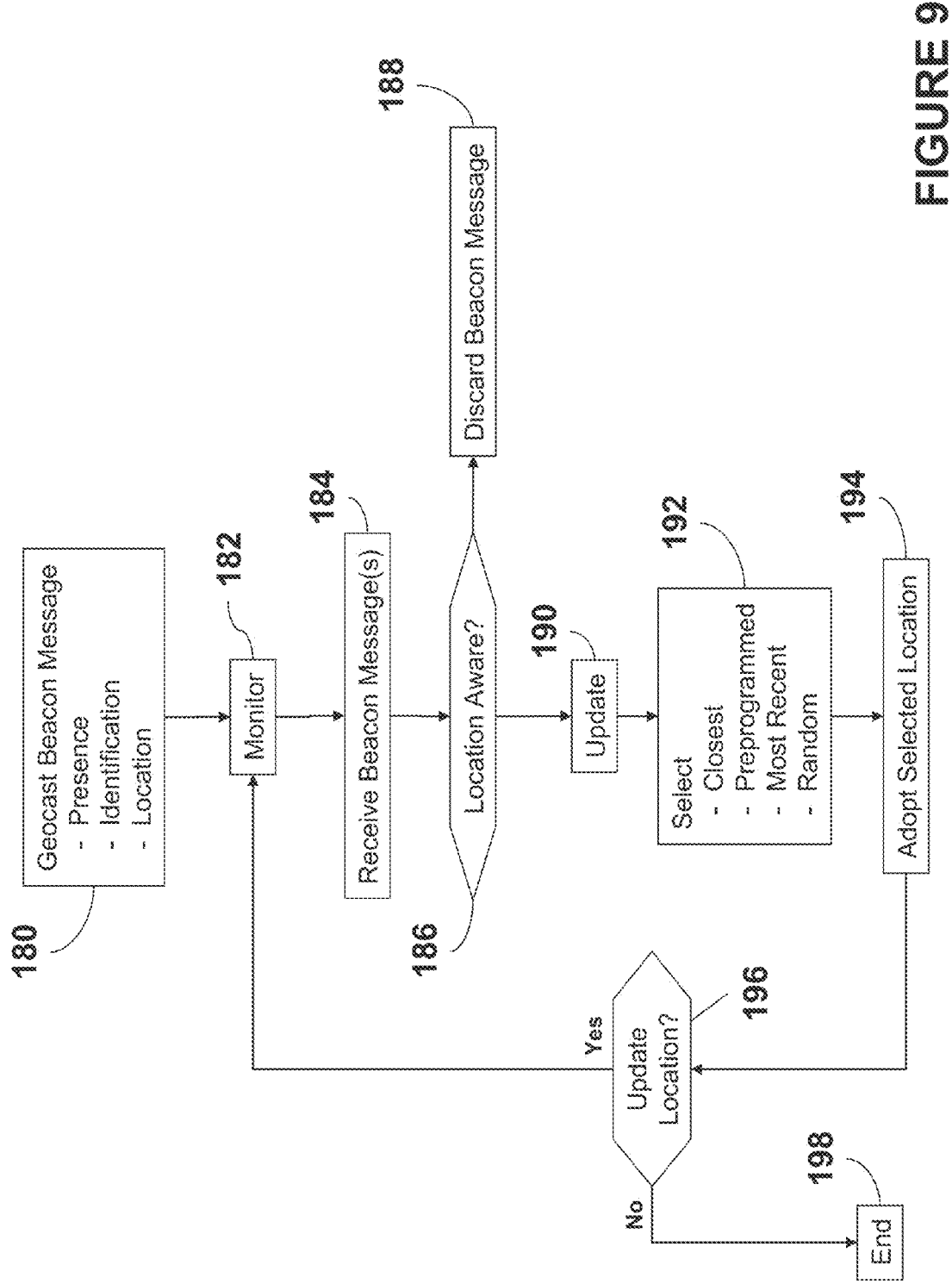
FIG. 9 is a flow diagram of another example process for acquiring/accessing information via a geocast protocol.

FIG. 9 is a flow diagram of another example process for acquiring/accessing information via a geocast protocol. In an example embodiment, a device that is not capable of determining it own location may adopt a location of another device, and use the adopted location as its own. A beacon message is geocast at step 180. In an example embodiment, the beacon message comprises an indication of the an identifier of the device's location, an indication of an identifier of the geocasting device, a geographic location of the geocasting device, or any appropriate combination thereof. A beacon message can be geocast by any number of devices. A beacon message can be geocast periodically, aperiodically, randomly, as trigger by an event (e.g., command), or any appropriate combination thereof.

Another device (other than the device that geocasted the beacon message) monitors for transmissions at step 182. A beacon message is received by the device at step 184. At step 184, it is determined if the device is location aware. That is, it is determined if the device is a location blind device. A location blind device (or location unaware device) is a device that does not possess the capability to determine its location. And, a location aware device is a device that possesses the capability to determine its location. The determination as to whether a device is location aware can be made in any appropriate manner. For example, the device could attempt to determine it location. If the attempt fails, the device can determine that it is location unaware (location blind device). If the attempt is successful, the device can determine that it is location aware (not a location blind device). In another example embodiment, the device could be preconfigured with a status indicator (bit or the like) indicating whether the device is location aware or location unaware. This status indicator could be analyzed at step 186.

If it is determined, at step 186, that the device is location unaware, the beacon message is discarded at step 188. If it is determined, at step 186, that the device is location aware, information in the device is updated at step 190. As previously described, multiple devices can geocast messages, and a receiving device could receive multiple beacon messages. Accordingly, at step 190, information in the receiving device is update with information contained in each beacon message is received. And, in an example embodiment, the information could be updated with the locations of multiple devices.

The receiving device selects one of the devices from which it received a beacon message as the device, whose location it will adopt. The selection can be based on any appropriate criteria. For example, if a beacon message is received from only one device, the one device is selected. As examples of other selection criteria, the closest device to the receiving device could be selected (e.g., determined by signal strength or the like), the device that geocast the most recently received beacon message could be selected, the receiving device could be programmed to select a particular device (or group of devices), the receiving device could randomly select a device, or the like, or any appropriate combination thereof.

The receiving device adopts the location of the selected device as its own location at step 194. The receiving device can participate in any and/or all geocast activities as described herein, utilizing the adopted location.

At step 196, it is determined if the receiving device wants to update its adopted location. This may be the case, for example, in which device are known and/or expected to move (e.g., drift). If it is determined, a step 196, that the adopted location is to be updated, the process proceeds to step 182 and proceeds therefrom as previously described.). If it is determined, a step 196, that the adopted location is to be updated, the process ends at step 198.

Figure 10:
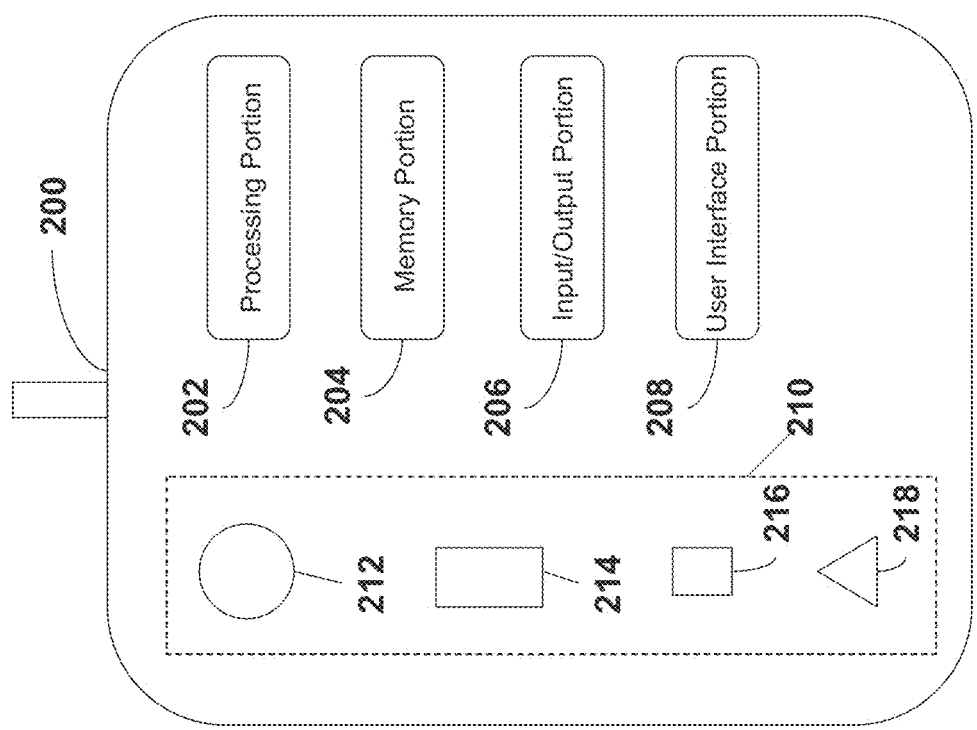
FIG. 10 is a block diagram of an example wireless communications device/sensor configurable to facilitate information acquisition via a scalable wireless geocast protocol.

FIG. 10 is a block diagram of an example wireless communications device, also referred to as a sensor 200, that is configurable to facilitate information acquisition via a scalable wireless geocast protocol, as described herein. The device/sensor 200 can include any appropriate device, mechanism, software, and/or hardware for facilitating information acquisition via a scalable wireless geocast protocol as described herein. As described herein, the device/sensor 200 comprises hardware, or a combination of hardware and software. And, each portion of the device/sensor 200 comprises hardware, or a combination of hardware and software. In an example configuration, the device/sensor 200 can comprise a processing portion 202, a memory portion 204, an input/output portion 206, a user interface (UI) portion 208, and a sensor portion 210 comprising at least one of a video camera portion 212, a force/wave sensor 214, a microphone 216, a moisture sensor 218, or a combination thereof. The force/wave sensor 214 comprises at least one of a motion detector, an accelerometer, an acoustic sensor, a tilt sensor, a pressure sensor, a temperature sensor, or the like. The motion detector is configured to detect motion occurring outside of the communications device, for example via disturbance of a standing wave, via electromagnetic and/or acoustic energy, or the like. The accelerator is capable of sensing acceleration, motion, and/or movement of the communications device. The acoustic sensor is capable of sensing acoustic energy, such as a noise, voice, etc., for example. The tilt sensor is capable of detecting a tilt of the communications device. The pressure sensor is capable of sensing pressure against the communications device, such as from a shock wave caused by broken glass or the like. The temperature sensor is capable of sensing a measuring temperature, such as inside of the vehicle, room, building, or the like. The moisture sensor 218 is capable of detecting moisture, such as detecting if the device/sensor 200 is submerged in a liquid. The processing portion 202, memory portion 204, input/output portion 206, user interface (UI) portion 208, video camera portion 212, force/wave sensor 214, and microphone 216 are coupled together to allow communications therebetween (coupling not shown in FIG. 10). The device/sensor 200 also can comprise a timer (not depicted in FIG. 10).

In various embodiments, the input/output portion 206 comprises a receiver of the device/sensor 200, a transmitter of the device/sensor 200, or a combination thereof. The input/output portion 206 is capable of, in conjunction with any other portion of the device/sensor 200 as needed, receiving and/or providing information pertaining to information acquisition via a scalable wireless geocast protocol, such as, for example, a query, a response to a query, a retransmitted query, a retransmitted response to a query, or the like, as described herein. The input/output portion 206 also is capable of communications with other devices/sensors, as described herein. For example, the input/output portion 206 can include a wireless communications (e.g., 2.5G/3G/4G) SIM card. The input/output portion 206 is capable of receiving and/or sending text information, video information, audio information, control information, image information, data, or any combination thereof. In an example embodiment, the input/output portion 206 is capable of receiving and/or sending information to determine a location of the device/sensor 200. In an example configuration, the input\output portion 206 comprises a GPS receiver. In an example configuration, the device/sensor 200 can determine its own geographical location through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output portion 206 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof. In an example configuration, the input/output portion comprises a WIFI finder, a two way GPS chipset or equivalent, or the like.

The processing portion 202 is capable of facilitating information acquisition via a scalable wireless geocast protocol, as described herein. For example, the processing portion 202 is capable of, in conjunction with any other portion of the device/sensor 200 as needed, generating a geocast message, generating a query, processing a query, processing a query response, determining if an indication of a region is contained in a geocast message, determining if an indication of a temporal condition is contained in a geocast message, determining if an indication of a type of information sought is contained in a geocast message, determining if the device/sensor 200 is within a region, determining if the device/sensor 200 is capable of obtaining the type of information sought, determining if the device/sensor 200 has obtained information in accordance with temporal conditions, or the like, or any combination thereof. The processing portion 202, in conjunction with any other portion of the device/sensor 200, can provide the ability for users/subscribers to enable, disable, and configure various features of an application for information acquisition via a scalable wireless geocast protocol, as described herein. The processing portion 202, in conjunction with any other portion of the device/sensor 200 as needed, can enable the device/sensor 200 to covert speech to text when it is configured to send text messages. In an example embodiment, the processing portion 202, in conjunction with any other portion of the device/sensor 200 as needed, can convert text to speech for rendering via the user interface portion 208.

In a basic configuration, the device/sensor 200 can include at least one memory portion 204. The memory portion 204 can store any information utilized in conjunction with information acquisition via a scalable wireless geocast protocol, as described herein. For example, the memory portion 204 is capable of storing information pertaining to a geocast message, a query, a query response, an indication of a region, an indication of a temporal condition, an indication of a type of information sought, geocast parameters, text/voice message, an audio/text message, subscriber profile information, subscriber identification information, phone numbers, an identification code of the device/sensor, video information, audio information, control information, information indicative of sensor data (e.g., raw individual sensor information, combination of sensor information, processed sensor information, etc.), or a combination thereof. Depending upon the exact configuration and type of processor, the memory portion 204 can be volatile (such as some types of RAM), non-volatile (such as ROM, flash memory, etc.). The device/sensor 200 can include additional storage (e.g., removable storage and/or non-removable storage) including, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or the like. In an example configuration, the memory portion 204, or a portion of the memory portion 202 is hardened such that information stored therein can be recovered if the device/sensor 200 is exposed to extreme heat, extreme vibration, extreme moisture, corrosive chemicals or gas, or the like. In an example configuration, the information stored in the hardened portion of the memory portion 204 is encrypted, or otherwise rendered unintelligible without use of an appropriate cryptographic key, password, biometric (voiceprint, fingerprint, retinal image, facial image, or the like). Wherein, use of the appropriate cryptographic key, password, biometric will render the information stored in the hardened portion of the memory portion 204 intelligible.

The device/sensor 200 also can contain a UI portion 208 allowing a user to communicate with the device/sensor 200. The UI portion 208 is capable of rendering any information utilized in conjunction with information acquisition via a scalable wireless geocast protocol as described herein. For example, the UI portion 208 can provide means for entering text, entering a phone number, rendering text, rendering images, rendering multimedia, rendering sound, rendering video, receiving sound, or the like, as described herein. The UI portion 208 can provide the ability to control the device/sensor 200, via, for example, buttons, soft keys, voice actuated controls, a touch screen, movement of the mobile device/sensor 200, visual cues (e.g., moving a hand in front of a camera on the mobile device/sensor 200), or the like. The UI portion 208 can provide visual information (e.g., via a display), audio information (e.g., via speaker), mechanically (e.g., via a vibrating mechanism), or a combination thereof. In various configurations, the UI portion 208 can comprise a display, a touch screen, a keyboard, a speaker, or any combination thereof. The UI portion 208 can comprise means for inputting biometric information, such as, for example, fingerprint information, retinal information, voice information, and/or facial characteristic information. The UI portion 208 can be utilized to enter an indication of the designated destination (e.g., the phone number, IP address, geographic information, or the like).

In an example embodiment, the sensor portion 210 of the device/sensor 200 comprises the video camera portion 212, the force/wave sensor 214, and the microphone 216. The video camera portion 212 comprises a camera (or cameras) and associated equipment capable of capturing still images and/or video and to provide the captured still images and/or video to other portions of the device/sensor 200. In an example embodiment, the force/wave sensor 214 comprises an accelerometer, a tilt sensor, an acoustic sensor capable of sensing acoustic energy, an optical sensor (e.g., infrared), or any combination thereof.

Although not necessary to implement information acquisition via a scalable wireless geocast protocol, a device/sensor can be part of and/or in communications with various wireless communications networks. Some of which are described below.

Figure 11:
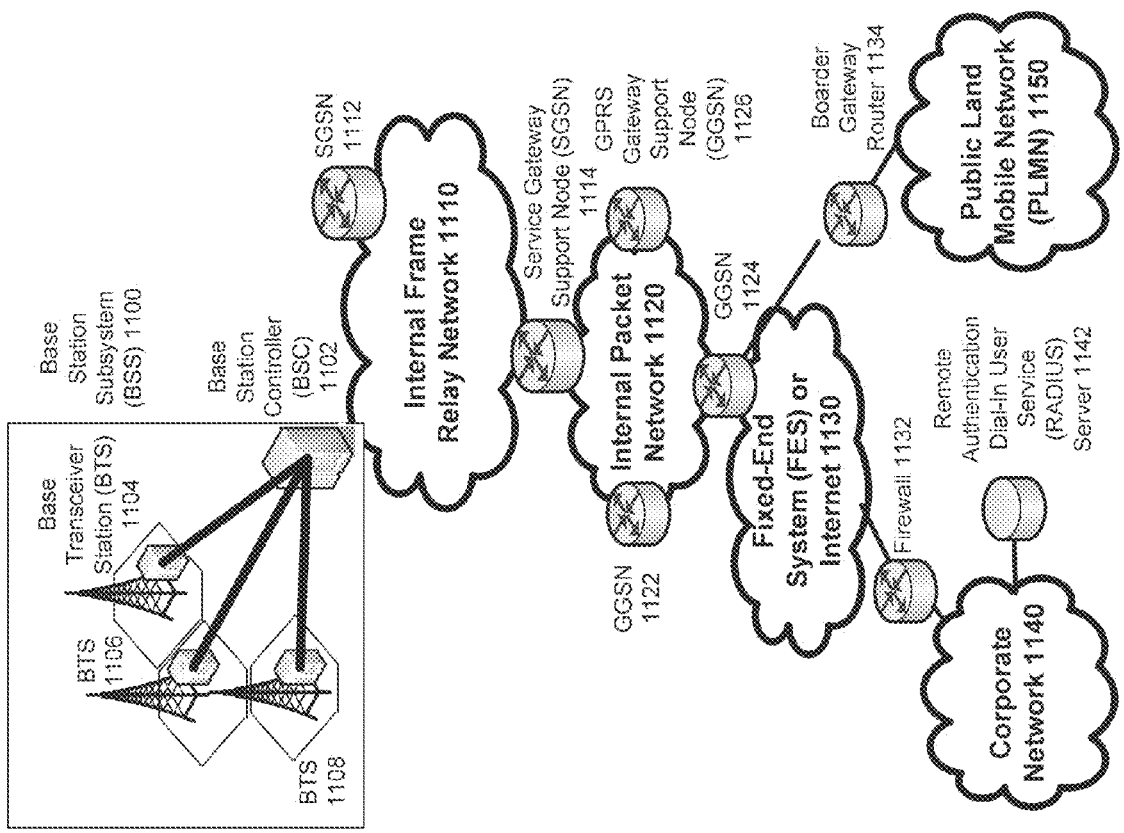
FIG. 11 depicts an overall block diagram of an exemplary packet-based mobile cellular network environment, such as a GPRS network, within which information acquisition via a scalable wireless geocast protocol can be implemented.

FIG. 11 depicts an overall block diagram of an exemplary packet-based mobile cellular network environment, such as a GPRS network, within which information acquisition via a scalable wireless geocast protocol can be implemented. In the exemplary packet-based mobile cellular network environment shown in FIG. 11, there are a plurality of Base Station Subsystems ("BSS") 1100 (only one is shown), each of which comprises a Base Station Controller ("BSC") 1102 serving a plurality of Base Transceiver Stations ("BTS") such as BTSs 1104, 1106, and 1108. BTSs 1104, 1106, 1108, etc. are the access points where users of packet-based mobile devices become connected to the wireless network. In exemplary fashion, the packet traffic originating from user devices is transported via an over-the-air interface to a BTS 1108, and from the BTS 1108 to the BSC 1102. Base station subsystems, such as BSS 1100, are a part of internal frame relay network 1110 that can include Service GPRS Support Nodes ("SGSN") such as SGSN 1112 and 1114. Each SGSN is connected to an internal packet network 1120 through which a SGSN 1112, 1114, etc. can route data packets to and from a plurality of gateway GPRS support nodes (GGSN) 1122, 1124, 1126, etc. As illustrated, SGSN 1114 and GGSNs 1122, 1124, and 1126 are part of internal packet network 1120. Gateway GPRS serving nodes 1122, 1124 and 1126 mainly provide an interface to external Internet Protocol ("IP") networks such as Public Land Mobile Network ("PLMN") 1150, corporate intranets 1140, or Fixed-End System ("FES") or the public Internet 1130. As illustrated, subscriber corporate network 1140 may be connected to GGSN 1124 via firewall 1132; and PLMN 1150 is connected to GGSN 1124 via boarder gateway router 1134. The Remote Authentication Dial-In User Service ("RADIUS") server 1142 may be used for caller authentication when a user of a mobile cellular device calls corporate network 1140.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 12:
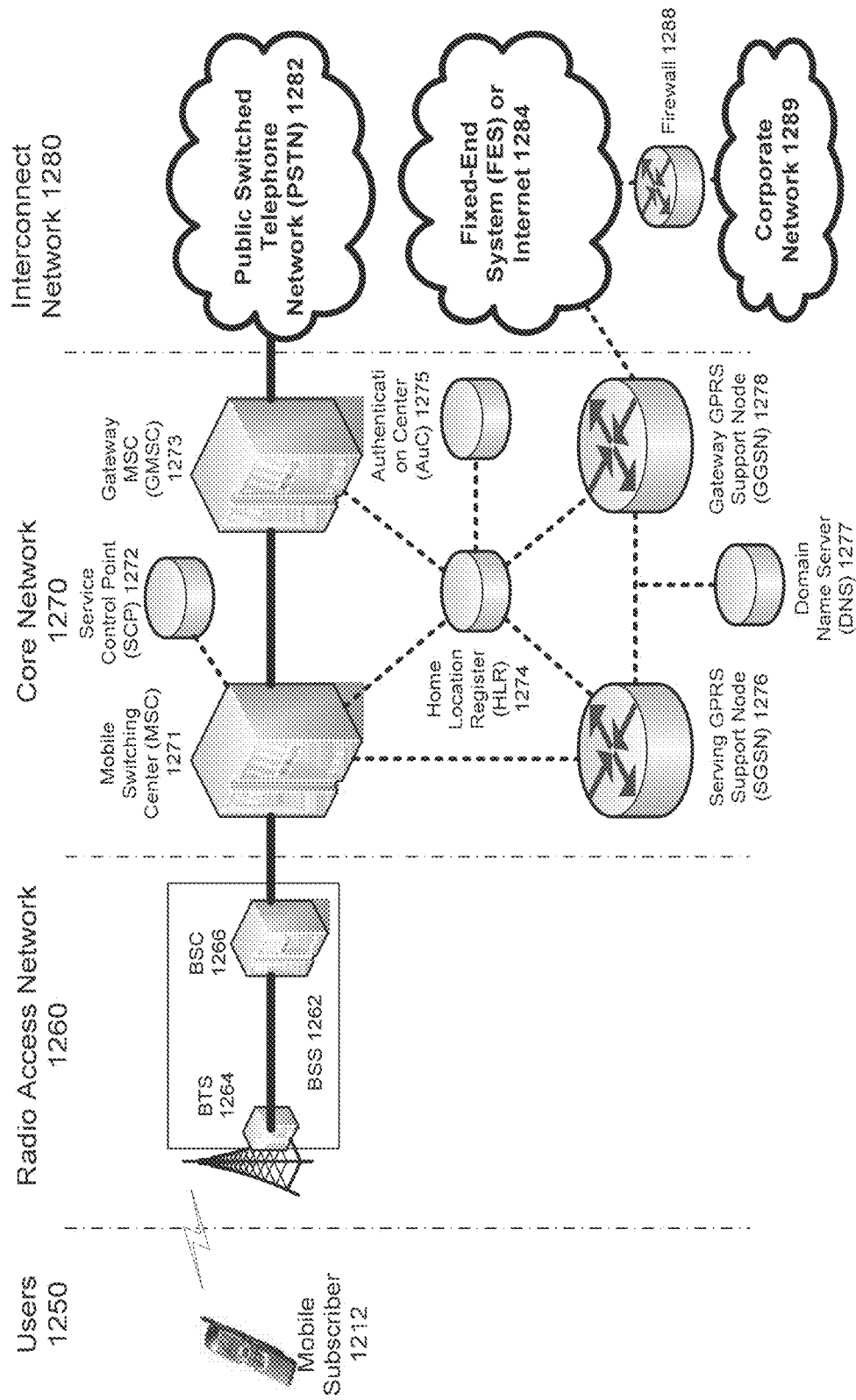
FIG. 12 illustrates an architecture of a typical GPRS network within which information acquisition via a scalable wireless geocast protocol can be implemented.

FIG. 12 illustrates an architecture of a typical GPRS network within which information acquisition via a scalable wireless geocast protocol can be implemented. The architecture depicted in FIG. 12 is segmented into four groups: users 1250, radio access network 1260, core network 1270, and interconnect network 1280. Users 1250 comprise a plurality of end users. Note, device 1212 is referred to as a mobile subscriber in the description of network shown in FIG. 12. In an example embodiment, the device depicted as mobile subscriber 1212 comprises a communications device (e.g., device/sensor 70). Radio access network 1260 comprises a plurality of base station subsystems such as BSSs 1262, which include BTSs 1264 and BSCs 1266. Core network 1270 comprises a host of various network elements. As illustrated in FIG. 12, core network 1270 may comprise Mobile Switching Center ("MSC") 1271, Service Control Point ("SCP") 1272, gateway MSC 1273, SGSN 1276, Home Location Register ("HLR") 1274, Authentication Center ("AuC") 1275, Domain Name Server ("DNS") 1277, and GGSN 1278. Interconnect network 1280 also comprises a host of various networks and other network elements. As illustrated in FIG. 12, interconnect network 1280 comprises Public Switched Telephone Network ("PSTN") 1282, Fixed-End System ("FES") or Internet 1284, firewall 1288, and Corporate Network 1289.

A mobile switching center can be connected to a large number of base station controllers. At MSC 1271, for instance, depending on the type of traffic, the traffic may be separated in that voice may be sent to Public Switched Telephone Network ("PSTN") 1282 through Gateway MSC ("GMSC") 1273, and/or data may be sent to SGSN 1276, which then sends the data traffic to GGSN 1278 for further forwarding.

When MSC 1271 receives call traffic, for example, from BSC 1266, it sends a query to a database hosted by SCP 1272. The SCP 1272 processes the request and issues a response to MSC 1271 so that it may continue call processing as appropriate.

The HLR 1274 is a centralized database for users to register to the GPRS network. HLR 1274 stores static information about the subscribers such as the International Mobile Subscriber Identity ("IMSI"), subscribed services, and a key for authenticating the subscriber. HLR 1274 also stores dynamic subscriber information such as the current location of the mobile subscriber. Associated with HLR 1274 is AuC 1275. AuC 1275 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 12, when mobile subscriber 1212 initiates the attach process by turning on the network capabilities of the mobile device, an attach request is sent by mobile subscriber 1212 to SGSN 1276. The SGSN 1276 queries another SGSN, to which mobile subscriber 1212 was attached before, for the identity of mobile subscriber 1212. Upon receiving the identity of mobile subscriber 1212 from the other SGSN, SGSN 1276 requests more information from mobile subscriber 1212. This information is used to authenticate mobile subscriber 1212 to SGSN 1276 by HLR 1274. Once verified, SGSN 1276 sends a location update to HLR 1274 indicating the change of location to a new SGSN, in this case SGSN 1276. HLR 1274 notifies the old SGSN, to which mobile subscriber 1212 was attached before, to cancel the location process for mobile subscriber 1212. HLR 1274 then notifies SGSN 1276 that the location update has been performed. At this time, SGSN 1276 sends an Attach Accept message to mobile subscriber 1212, which in turn sends an Attach Complete message to SGSN 1276.

After attaching itself with the network, mobile subscriber 1212 then goes through the authentication process. In the authentication process, SGSN 1276 sends the authentication information to HLR 1274, which sends information back to SGSN 1276 based on the user profile that was part of the user's initial setup. The SGSN 1276 then sends a request for authentication and ciphering to mobile subscriber 1212. The mobile subscriber 1212 uses an algorithm to send the user identification (ID) and password to SGSN 1276. The SGSN 1276 uses the same algorithm and compares the result. If a match occurs, SGSN 1276 authenticates mobile subscriber 1212.

Next, the mobile subscriber 1212 establishes a user session with the destination network, corporate network 1289, by going through a Packet Data Protocol ("PDP") activation process. Briefly, in the process, mobile subscriber 1212 requests access to the Access Point Name ("APN"), for example, UPS.com, and SGSN 1276 receives the activation request from mobile subscriber 1212. SGSN 1276 then initiates a Domain Name Service ("DNS") query to learn which GGSN node has access to the UPS.com APN. The DNS query is sent to the DNS server within the core network 1270, such as DNS 1277, which is provisioned to map to one or more GGSN nodes in the core network 1270. Based on the APN, the mapped GGSN 1278 can access the requested corporate network 1289. The SGSN 1276 then sends to GGSN 1278 a Create Packet Data Protocol ("PDP") Context Request message that contains necessary information. The GGSN 1278 sends a Create PDP Context Response message to SGSN 1276, which then sends an Activate PDP Context Accept message to mobile subscriber 1212.

Once activated, data packets of the call made by mobile subscriber 1212 can then go through radio access network 1260, core network 1270, and interconnect network 1280, in a particular fixed-end system or Internet 1284 and firewall 1288, to reach corporate network 1289.

Figure 13:
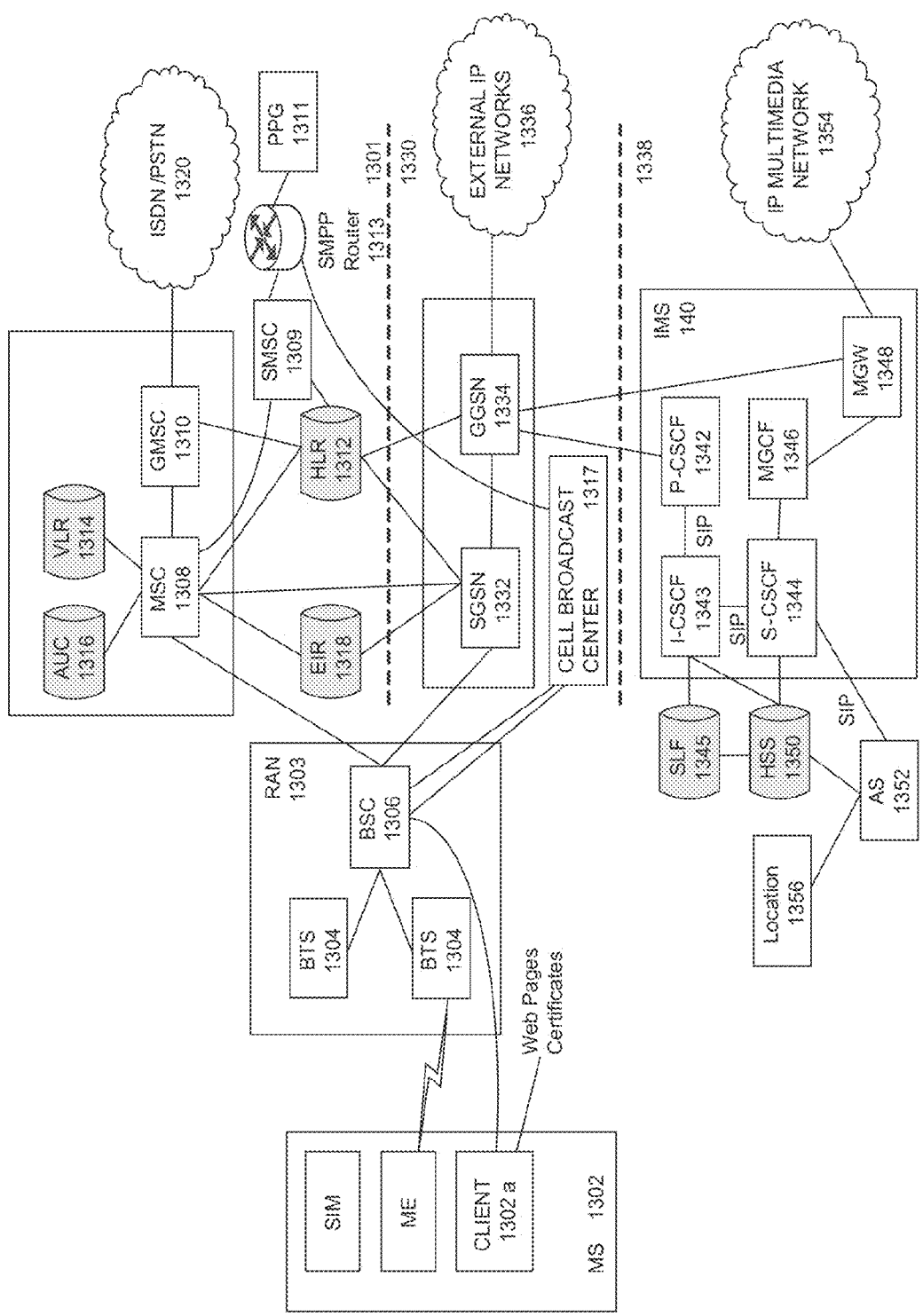
FIG. 13 illustrates an exemplary block diagram view of a GSM/GPRS/IP multimedia network architecture within information acquisition via a scalable wireless geocast protocol can be implemented.

FIG. 13 illustrates an exemplary block diagram view of a GSM/GPRS/IP multimedia network architecture within information acquisition via a scalable wireless geocast protocol can be implemented. As illustrated, the architecture of FIG. 13 includes a GSM core network 1301, a GPRS network 1330 and an IP multimedia network 1338. The GSM core network 1301 includes a Mobile Station (MS) 1302, at least one Base Transceiver Station (BTS) 1304 and a Base Station Controller (BSC) 1306. The MS 1302 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 1304 is physical equipment, such as a radio tower, that enables a radio interface to communicate with the MS. Each BTS may serve more than one MS. The BSC 1306 manages radio resources, including the BTS. The BSC may be connected to several BTSs. The BSC and BTS components, in combination, are generally referred to as a base station (BSS) or radio access network (RAN) 1303.

The GSM core network 1301 also includes a Mobile Switching Center (MSC) 1308, a Gateway Mobile Switching Center (GMSC) 1310, a Home Location Register (HLR) 1312, Visitor Location Register (VLR) 1314, an Authentication Center (AuC) 1318, and an Equipment Identity Register (EIR) 1316. The MSC 1308 performs a switching function for the network. The MSC also performs other functions, such as registration, authentication, location updating, handovers, and call routing. The GMSC 1310 provides a gateway between the GSM network and other networks, such as an Integrated Services Digital Network (ISDN) or Public Switched Telephone Networks (PSTNs) 1320. Thus, the GMSC 1310 provides interworking functionality with external networks.

The HLR 1312 is a database that contains administrative information regarding each subscriber registered in a corresponding GSM network. The HLR 1312 also contains the current location of each MS. The VLR 1314 is a database that contains selected administrative information from the HLR 1312. The VLR contains information necessary for call control and provision of subscribed services for each MS currently located in a geographical area controlled by the VLR. The HLR 1312 and the VLR 1314, together with the MSC 1308, provide the call routing and roaming capabilities of GSM. The AuC 1316 provides the parameters needed for authentication and encryption functions. Such parameters allow verification of a subscriber's identity. The EIR 1318 stores security-sensitive information about the mobile equipment.

A Short Message Service Center (SMSC) 1309 allows one-to-one Short Message Service (SMS) messages to be sent to/from the MS 1302. A Push Proxy Gateway (PPG) 1311 is used to "push" (i.e., send without a synchronous request) content to the MS 1302. The PPG 1311 acts as a proxy between wired and wireless networks to facilitate pushing of data to the MS 1302. A Short Message Peer to Peer (SMPP) protocol router 1313 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1302 sends a location update including its current location information to the MSC/VLR, via the BTS 1304 and the BSC 1306. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1330 is logically implemented on the GSM core network architecture by introducing two packet-switching network nodes, a serving GPRS support node (SGSN) 1332, a cell broadcast and a Gateway GPRS support node (GGSN) 1334. The SGSN 1332 is at the same hierarchical level as the MSC 1308 in the GSM network. The SGSN controls the connection between the GPRS network and the MS 1302. The SGSN also keeps track of individual MS's locations and security functions and access controls.

A Cell Broadcast Center (CBC) 1317 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1334 provides a gateway between the GPRS network and a public packet network (PDN) or other IP networks 1336. That is, the GGSN provides interworking functionality with external networks, and sets up a logical link to the MS through the SGSN. When packet-switched data leaves the GPRS network, it is transferred to an external TCP-IP network 1336, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1330 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel. In a NOM3 network, a MS can monitor pages for a circuit switched network while received data and vise versa.

The IP multimedia network 1338 was introduced with 3GPP Release 5, and includes an IP multimedia subsystem (IMS) 1340 to provide rich multimedia services to end users. A representative set of the network entities within the IMS 1340 are a call/session control function (CSCF), a media gateway control function (MGCF) 1346, a media gateway (MGW) 1348, and a master subscriber database, called a home subscriber server (HSS) 1350. The HSS 1350 may be common to the GSM network 1301, the GPRS network 1330 as well as the IP multimedia network 1338.

The IP multimedia system 1340 is built around the call/session control function, of which there are three types: an interrogating CSCF (I-CSCF) 1343, a proxy CSCF (P-CSCF) 1342, and a serving CSCF (S-CSCF) 1344. The P-CSCF 1342 is the MS's first point of contact with the IMS 1340. The P-CSCF 1342 forwards session initiation protocol (SIP) messages received from the MS to an SIP server in a home network (and vice versa) of the MS. The P-CSCF 1342 may also modify an outgoing request according to a set of rules defined by the network operator (for example, address analysis and potential modification).

The I-CSCF 1343, forms an entrance to a home network and hides the inner topology of the home network from other networks and provides flexibility for selecting an S-CSCF. The I-CSCF 1343 may contact a subscriber location function (SLF) 1345 to determine which HSS 1350 to use for the particular subscriber, if multiple HSS's 1350 are present. The S-CSCF 1344 performs the session control services for the MS 1302. This includes routing originating sessions to external networks and routing terminating sessions to visited networks. The S-CSCF 1344 also decides whether an application server (AS) 1352 is required to receive information on an incoming SIP session request to ensure appropriate service handling. This decision is based on information received from the HSS 1350 (or other sources, such as an application server 1352). The AS 1352 also communicates to a location server 1356 (e.g., a Gateway Mobile Location Center (GMLC)) that provides a position (e.g., latitude/longitude coordinates) of the MS 1302.

The HSS 1350 contains a subscriber profile and keeps track of which core network node is currently handling the subscriber. It also supports subscriber authentication and authorization functions (AAA). In networks with more than one HSS 1350, a subscriber location function provides information on the HSS 1350 that contains the profile of a given subscriber.

The MGCF 1346 provides interworking functionality between SIP session control signaling from the IMS 1340 and ISUP/BICC call control signaling from the external GSTN networks (not shown). It also controls the media gateway (MGW) 1348 that provides user-plane interworking functionality (e.g., converting between AMR- and PCM-coded voice). The MGW 1348 also communicates with other IP multimedia networks 1354.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 14:
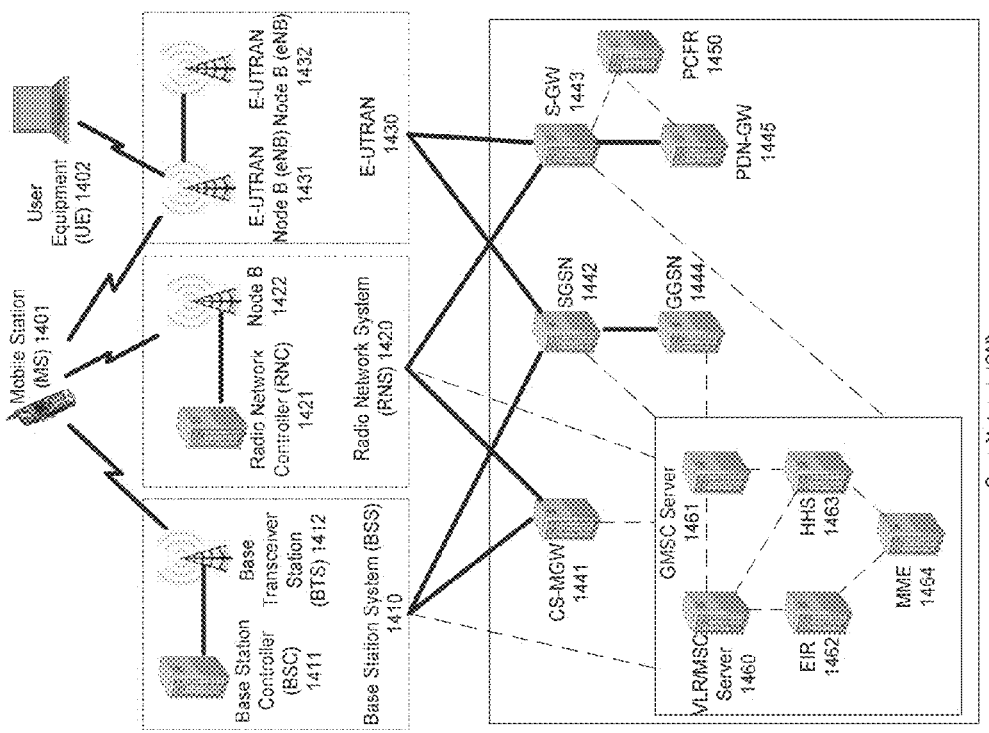
FIG. 14 illustrates a PLMN block diagram view of an exemplary architecture in which the information acquisition via a scalable wireless geocast protocol may be incorporated.

FIG. 14 illustrates a PLMN block diagram view of an exemplary architecture in which the information acquisition via a scalable wireless geocast protocol may be incorporated. Mobile Station (MS) 1401 is the physical equipment used by the PLMN subscriber. In one illustrative embodiment, WT 200 and/or communications device 120 may serve as Mobile Station 1401. Mobile Station 1401 may be one of, but not limited to, a cellular telephone, a cellular telephone in combination with another electronic device or any other wireless mobile communication device.

Mobile Station 1401 may communicate wirelessly with Base Station System (BSS) 1410. BSS 1410 contains a Base Station Controller (BSC) 1411 and a Base Transceiver Station (BTS) 1412. BSS 1410 may include a single BSC 1411/BTS 1412 pair (Base Station) or a system of BSC/BTS pairs which are part of a larger network. BSS 1410 is responsible for communicating with Mobile Station 1401 and may support one or more cells. BSS 1410 is responsible for handling cellular traffic and signaling between Mobile Station 1401 and Core Network 1440. Typically, BSS 1410 performs functions that include, but are not limited to, digital conversion of speech channels, allocation of channels to mobile devices, paging, and transmission/reception of cellular signals.

Additionally, Mobile Station 1401 may communicate wirelessly with Radio Network System (RNS) 1420. RNS 1420 contains a Radio Network Controller (RNC) 1421 and one or more Node(s) B 1422. RNS 1420 may support one or more cells. RNS 1420 may also include one or more RNC 1421/Node B 1422 pairs or alternatively a single RNC 1421 may manage multiple Nodes B 1422. RNS 1420 is responsible for communicating with Mobile Station 1401 in its geographically defined area. RNC 1421 is responsible for controlling the Node(s) B 1422 that are connected to it and is a control element in a UMTS radio access network. RNC 1421 performs functions such as, but not limited to, load control, packet scheduling, handover control, security functions, as well as controlling Mobile Station 1401's access to the Core Network (CN) 1440.

The evolved UMTS Terrestrial Radio Access Network (E-UTRAN) 1430 is a radio access network that provides wireless data communications for Mobile Station 1401 and User Equipment 1402. E-UTRAN 1430 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1430 may include of series of logical network components such as E-UTRAN Node B (eNB) 1431 and E-UTRAN Node B (eNB) 1432. E-UTRAN 1430 may contain one or more eNBs. User Equipment 1402 may be any user device capable of connecting to E-UTRAN 1430 including, but not limited to, a personal computer, laptop, mobile device, wireless router, or other device capable of wireless connectivity to E-UTRAN 1430. The improved performance of the E-UTRAN 1430 relative to a typical UMTS network allows for increased bandwidth, spectral efficiency, and functionality including, but not limited to, voice, high-speed applications, large data transfer and IPTV, while still allowing for full mobility.

An exemplary embodiment of a mobile data and communication service that may be implemented in the PLMN architecture described in FIG. 14 is the Enhanced Data rates for GSM Evolution (EDGE). EDGE is an enhancement for GPRS networks that implements an improved signal modulation scheme known as 8-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1401 may communicate with any or all of BSS 1410, RNS 1420, or E-UTRAN 1430. In a illustrative system, each of BSS 1410, RNS 1420, and E-UTRAN 1430 may provide Mobile Station 1401 with access to Core Network 1440. The Core Network 1440 may include of a series of devices that route data and communications between end users. Core Network 1440 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched-Media Gateway Function (CS-MGW) 1441 is part of Core Network 1440, and interacts with Visitor Location Register (VLR) and Mobile-Services Switching Center (MSC) Server 1460 and Gateway MSC Server 1461 in order to facilitate Core Network 1440 resource control in the CS domain. Functions of CS-MGW 1441 include, but are not limited to, media conversion, bearer control, payload processing and other mobile network processing such as handover or anchoring. CS-MGW 1440 may receive connections to Mobile Station 1401 through BSS 1410, RNS 1420 or both.

Serving GPRS Support Node (SGSN) 1442 stores subscriber data regarding Mobile Station 1401 in order to facilitate network functionality. SGSN 1442 may store subscription information such as, but not limited to, the International Mobile Subscriber Identity (IMSI), temporary identities, or Packet Data Protocol (PDP) addresses. SGSN 1442 may also store location information such as, but not limited to, the Gateway GPRS Support Node (GGSN) 1444 address for each GGSN where an active PDP exists. GGSN 1444 may implement a location register function to store subscriber data it receives from SGSN 1442 such as subscription or location information.

Serving Gateway (S-GW) 1443 is an interface which provides connectivity between E-UTRAN 1430 and Core Network 1440. Functions of S-GW 1443 include, but are not limited to, packet routing, packet forwarding, transport level packet processing, event reporting to Policy and Charging Rules Function (PCRF) 1450, and mobility anchoring for inter-network mobility. PCRF 1450 uses information gathered from S-GW 1443, as well as other sources, to make applicable policy and charging decisions related to data flows, network resources and other network administration functions. Packet Data Network Gateway (PDN-GW) 1445 may provide user-to-services connectivity functionality including, but not limited to, network-wide mobility anchoring, bearer session anchoring and control, and IP address allocation for PS domain connections.

Home Subscriber Server (HSS) 1463 is a database for user information, and stores subscription data regarding Mobile Station 1401 or User Equipment 1402 for handling calls or data sessions. Networks may contain one HSS 1463 or more if additional resources are required. Exemplary data stored by HSS 1463 include, but is not limited to, user identification, numbering and addressing information, security information, or location information. HSS 1463 may also provide call or session establishment procedures in both the PS and CS domains.

The VLR/MSC Server 1460 provides user location functionality. When Mobile Station 1401 enters a new network location, it begins a registration procedure. A MSC Server for that location transfers the location information to the VLR for the area. A VLR and MSC Server may be located in the same computing environment, as is shown by VLR/MSC Server 1460, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1401 registration or procedures for handover of Mobile Station 1401 to a different section of the Core Network 1440. GMSC Server 1461 may serve as a connection to alternate GMSC Servers for other mobile stations in larger networks.

Equipment Identity Register (EIR) 1462 is a logical element which may store the International Mobile Equipment Identities (IMEI) for Mobile Station 1401. In a typical embodiment, user equipment may be classified as either "white listed" or "black listed" depending on its status in the network. In one embodiment, if Mobile Station 1401 is stolen and put to use by an unauthorized user, it may be registered as "black listed" in EIR 1462, preventing its use on the network. Mobility Management Entity (MME) 1464 is a control node which may track Mobile Station 1401 or User Equipment 1402 if the devices are idle. Additional functionality may include the ability of MME 1464 to contact an idle Mobile Station 1401 or User Equipment 1402 if retransmission of a previous session is required.

While example embodiments of information acquisition via a scalable wireless geocast protocol have been described in connection with various computing devices/processors, the underlying concepts can be applied to any computing device, processor, or system capable of implementing information acquisition via a scalable wireless geocast protocol. The various techniques described herein can be implemented in connection with hardware or software or, where appropriate, with a combination of both. Thus, the methods and apparatuses of information acquisition via a scalable wireless geocast protocol can be implemented, or certain aspects or portions thereof, can take the form of program code (i.e., instructions) embodied in tangible storage media having a tangible physical structure. Examples of tangible storage media include floppy diskettes, CD-ROMs, DVDs, hard drives, or any other tangible machine-readable storage medium (tangible computer-readable storage medium). Thus, a tangible storage medium as described herein is not a transient propagating signal. When the program code is loaded into and executed by a machine, such as a computer, the machine becomes an apparatus for implementing information acquisition via a scalable wireless geocast protocol. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for information acquisition via a scalable wireless geocast protocol also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing information acquisition via a scalable wireless geocast protocol. When implemented on a general-purpose processor, the program code combines with the processor to provide a unique apparatus that operates to invoke the functionality of information acquisition via a scalable wireless geocast protocol.

While information acquisition via a scalable wireless geocast protocol has been described in connection with the various embodiments of the various figures, it is to be understood that other similar embodiments can be used or modifications and additions can be made to the described embodiments for information acquisition via a scalable wireless geocast protocol without deviating therefrom. For example, one skilled in the art will recognize that information acquisition via a scalable wireless geocast protocol as described in the present application may apply to any environment, whether wired or wireless, and may be applied to any number of such devices connected via a communications network and interacting across the network. Therefore, information acquisition via a scalable wireless geocast protocol should not be limited to any single embodiment, but rather should be construed in breadth and scope in accordance with the appended claims.

What is claimed:

1. A method comprising:

receiving, via a geocast protocol, by a device in a mobile ad hoc network, a query message comprising a query for information, the query message comprising an indication of a region of intended reception of the query message, the region defined by a first defined size;

altering, by the device, the region of the first defined size to a region of a second defined size based on a number of sensors in the region of the first defined size;

determining if the device is within the region of the second defined size;

upon a determination that the device is not within the region of the second defined size, not responding to the query;

upon a determination that the device is within the region of the second defined size;

determining if the query message comprises an indication of a type of information being sought;

upon a determination that the query message comprises an indication of a type of information being sought:

determining if the device is capable of obtaining the type of information being sought;

upon a determination that the device is capable of obtaining the type of information being sought, providing, via the geocast protocol, a response to the query; and upon a determination that the device is not capable of obtaining the type of information being sought, not providing a response to the query.

2. The method of claim 1, further comprising:
upon the determination that the device is within the region of the second defined size, determining if the query message comprises an indication of a temporal condition; and
upon a determination that the query message comprises an indication of a temporal condition, providing a response to the query, via the geocast protocol, in accordance with the temporal condition.

3. The method of claim 1, further comprising:
upon the determination that the device is not within the region of the second defined size, retransmitting the query via the geocast protocol.

4. The method in accordance with claim 1, further comprising:
upon the determination that the device is not within the region of the second defined size, retransmitting the query, via the geocast protocol, in accordance with a location at which the query was received.

5. The method in accordance with claim 1, further comprising:
upon the determination that the device is not within the region of the second defined size:
determining whether a same query was received at least a predetermined number of times; and
upon a determination that the query has not been received the predetermined number of times, retransmitting the query, via the geocast protocol.

6. The method in accordance with claim 1, further comprising:
upon the determination that the device is not within the region of the second defined size:
determining whether the query was sent from a location closer than a predetermined minimum distance from a location of the device; and
upon a determination that the query was not sent from a location closer than the predetermined minimum distance from the location of the device, retransmitting the query, via the geocast protocol.

7. The method of claim 1, further comprising:
providing, via a unicast over a reverse message path, a response to the query based on a result of processing the query, wherein the reverse message path is described in the received query message.

8. A sensor comprising:
a processor; and
memory coupled to the processor, the memory comprising executable instructions that when executed by the processor cause the processor to effectuate operations comprising:
receiving, via a geocast protocol, by the sensor in a mobile ad hoc network, a query message comprising a query for information, the query message comprising an indication of a region of intended reception of the query message, the region defined by a first defined size;
altering, by the device, the region of the first defined size to a region of a second defined size based on a number of sensors in the region of the first defined size;
determining if the sensor is within the region of the second defined size;
upon a determination that the sensor is not within the region of the second defined size, not responding to the query; and
upon a determination that the sensor is within the region of the second defined size;
determining if the query message comprises an indication of a type of information being sought;
upon a determination that the query message comprises an indication of a type of information being sought:
determining if the sensor is capable of obtaining the type of information being sought; and
upon a determination that the sensor is capable of obtaining the type of information being sought, providing, via the geocast protocol, a response to the query.

9. The sensor of claim 8, the operations further comprising:
upon the determination that the device is within the region of the second defined size:
processing the query message to determine if the query comprises an indication of a temporal condition; and
if the query message comprises an indication of a temporal condition, providing the response, via the geocast protocol, in accordance with the temporal condition.

10. The sensor of claim 8, the operations further comprising:
upon the determination that the sensor is not within the region of the second defined size,
the operations further comprising at least one of:
retransmitting the query via the geocast protocol;
retransmitting the query, via the geocast protocol, in accordance a location at which the query message was received;
determining whether a same query was received at least a predetermined number of times and when it is determined that the same query has not been received the predetermined number of times, retransmitting the query message, via the geocast protocol; or
determining whether the query message was sent from a location closer than a predetermined minimum distance from a location of sensor and when it is determined that the query message was not sent from a location closer than the predetermined minimum distance from the location of sensor retransmitting the query message, via the geocast protocol.

11. The sensor of claim 8, the operations further comprising:
providing, via a unicast over a reverse message path, a response to the query based on a result of processing the query, wherein the reverse message path is described in the received query message.

12. A non-transitory storage medium comprising executable instructions that when executed by a processor cause the processor to effectuate operations comprising:
receiving, via a geocast protocol, by a device in a mobile ad hoc network, a query message comprising a query for information, the query message comprising an indication of a region of intended reception of the query message, the region defined by a first defined size;
altering, by the device, the region of the first defined size to a region of a second defined size based on a number of sensors in the region of the first defined size;
determining if the device is within the region of the second defined size;
upon a determination that the device is not within the region of the second defined size, not responding to the query;
upon a determination that the device is within the region of the second defined size;
determining if the query message comprises an indication of a type of information being sought;

upon a determination that the query message comprises an indication of a type of information being sought:
  determining if the device is capable of obtaining the type of information being sought;
  upon a determination that the device is capable of obtaining the type of information being sought, providing, via the geocast protocol, a response to the query; and
  upon a determination that the device is not capable of obtaining the type of information being sought, not providing a response to the query.

13. The non-transitory storage medium of claim 12, the operations further comprising at least one of:
  upon the determination that the device is within the region of the second defined size:
    providing a response to the query in accordance with a result of processing the query via the geocast protocol, or
    providing a response to the query in accordance with a result of processing the query via a unicast over a reverse message path.

14. The non-transitory storage medium of claim 12, the operations further comprising:
  upon the determination that the device is within the region of the second defined size:
    determining if the query message comprises an indication of a temporal condition; and
    when it is determined that the query comprises an indication of a temporal condition, providing a response to the query, via the geocast protocol, in accordance with the temporal condition.

15. The non-transitory storage medium of claim 12, upon the determination that the recipient of the query is not within the region of the second defined size, the operations further comprising at least one of:
  retransmitting the query via the geocast protocol;
  retransmitting the query, via the geocast protocol, in accordance with a location at which the query was received;
  determining whether a same query was received at least a predetermined number of times and when it is determined that the same query has not been received the predetermined number of times, retransmitting the query, via the geocast protocol; or
  determining whether the query was sent from a location closer than a predetermined minimum distance from a location of the device and when it is determined that the query was not sent from a location closer than the predetermined minimum distance from the location of the device, retransmitting the query, via the geocast protocol.

16. The non-transitory storage medium of claim 12, the operations further comprising:
  providing, via a unicast over a reverse message path, a response to the query based on a result of processing the query, wherein the reverse message path is described in the received query message.

* * * * *